US008954777B2

(12) United States Patent
Tatsumoto et al.

(10) Patent No.: US 8,954,777 B2
(45) Date of Patent: Feb. 10, 2015

(54) ELECTRONIC APPARATUS AND IMAGE FORMING APPARATUS

(71) Applicants: Yuhei Tatsumoto, Toyokawa (JP); Takashi Hasebe, Sagamihara (JP); Tomonobu Tamura, Toyokawa (JP); Yasutaka Tanimura, Okazaki (JP); Hiroshi Eguchi, Okazaki (JP); Hiroshi Hiraguchi, Toyokawa (JP)

(72) Inventors: Yuhei Tatsumoto, Toyokawa (JP); Takashi Hasebe, Sagamihara (JP); Tomonobu Tamura, Toyokawa (JP); Yasutaka Tanimura, Okazaki (JP); Hiroshi Eguchi, Okazaki (JP); Hiroshi Hiraguchi, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 230 days.

(21) Appl. No.: 13/689,010

(22) Filed: Nov. 29, 2012

(65) Prior Publication Data

US 2013/0145184 A1 Jun. 6, 2013

(30) Foreign Application Priority Data

Dec. 2, 2011 (JP) .................................. 2011-265086

(51) Int. Cl.
*H02J 7/00* (2006.01)
*G06F 1/26* (2006.01)
(52) U.S. Cl.
CPC ..................................... *G06F 1/263* (2013.01)
USPC ........... 713/340; 713/300; 320/127; 320/132; 320/134; 324/427; 702/63
(58) Field of Classification Search
USPC .................. 713/300, 340; 320/127, 132, 134; 324/427; 702/63
See application file for complete search history.

(56) References Cited

U.S. PATENT DOCUMENTS

| 7,459,884 | B2 | 12/2008 | Sasaki et al. | |
|---|---|---|---|---|
| 8,577,219 | B2* | 11/2013 | Nakashima et al. | 396/279 |
| 8,716,980 | B2* | 5/2014 | Lim | 320/116 |
| 2007/0046264 | A1* | 3/2007 | Choi | 320/162 |

(Continued)

FOREIGN PATENT DOCUMENTS

| CN | 101563253 A | 10/2009 |
|---|---|---|
| JP | 2005-315597 A | 11/2005 |

(Continued)

OTHER PUBLICATIONS

Office Action issued on Jul. 11, 2014, by the State Intellectual Property Office of the People's Republic of China in corresponding Chinese Patent Application No. 201210500341.6, and an English Translation of the Office Action. (20 pages).

*Primary Examiner* — M Elamin
(74) *Attorney, Agent, or Firm* — Buchanan Ingersoll & Rooney PC

(57) ABSTRACT

An electronic apparatus comprising: a main body including a reception unit and a processing unit; and a power supply device switches between an operation state for supplying power from an external power source to the main body and a standby state for supplying power from a secondary battery to the reception unit without supplying power from the power source to the main body. Charging of the battery with power from the power source is performed during the operation state and is terminated when a value indicating power level of the battery reaches a threshold value Vt satisfying (discharge lower limit VL+Vs)≤Vt<charge upper limit VH, Vs denoting a decrease in power level occurring when power from the battery is supplied to the reception unit for an estimated maximum duration of the standby state within a time period having a unit time length.

19 Claims, 16 Drawing Sheets

(56) References Cited

U.S. PATENT DOCUMENTS

| | | |
|---|---|---|
| 2009/0138149 A1 | 5/2009 | Chattot |
| 2009/0174366 A1* | 7/2009 | Ahmad et al. ............... 320/114 |
| 2010/0164294 A1* | 7/2010 | Choi .............................. 307/80 |

FOREIGN PATENT DOCUMENTS

| | | |
|---|---|---|
| JP | 2009-052975 A | 3/2009 |
| JP | 2011-229274 A | 11/2011 |

* cited by examiner

| Discharge | Start time point | 9:10 | 9:20 | 9:40 | | 18:00 | *:* |
|---|---|---|---|---|---|---|---|
| | End time point | 9:15 | 9:30 | 10:00 | | 9:00 | *:* | t21

Previous day | Present day

ELECTRONIC APPARATUS AND IMAGE FORMING APPARATUS

CROSS-REFERENCE TO RELATED APPLICATIONS

This application is based on application No. 2011-265086 filed in Japan, the contents of which are hereby incorporated by reference.

BACKGROUND OF THE INVENTION (1) Field of the Invention

The present invention relates to an electronic apparatus to be provided with a secondary battery and an image forming apparatus to be provided with a secondary battery.

(2) Description of the Related Art

Electronic apparatuses of various types operate on both power supplied from a commercial power source (an external power source) and power supplied from a secondary battery, such as a nickel-metal hydride battery.

For instance, an image forming apparatus, which is one type of an electronic apparatus, may be provided with an image forming unit (a processing unit) that executes image forming and an interface (a reception unit) that receives an instruction for image forming issued from outside the image forming apparatus. Convention technology proposes, as a system for utilizing both power supplied from a commercial power source and power supplied from a secondary battery in such an image forming apparatus, a structure of switching between a standby state and an operation state.

Here, the standby state refers to a state where power from the commercial power source is neither supplied to the image forming unit nor the interface while power from the secondary battery is supplied to the interface. On the other hand, the operation state refers to a state where power from the commercial power source is supplied to both the image forming unit and the interface.

More specifically, by executing an image forming operation during the operation state and by switching from the operation state to the standby state when an image forming operation is not executed, the interface is able to receive an instruction for image forming during the standby state by power being supplied thereto from the secondary battery at the same time as conservation of power is realized due to consumption of power supplied from the commercial power source being suppressed during the standby state.

Further, when implementing the above-described structure where switching between the standby state and the operation state is performed, so as to ensure that power from the secondary battery is supplied to the interface during the standby state, charging of the secondary battery is completed during the operation state.

However, switching to the operation state is performed, or in other words, image forming is executed only when a user instruction is received. As such, it is highly uncertain as to when and how long the secondary battery can be charged since the frequency at which user instructions are received differs depending on the time of the day. That is, user instructions may be received very frequently during one time period of the day, whereas user instructions may be rarely received during another time period of the day.

When, as mentioned above, it is highly uncertain as to when and how long the secondary battery can be charged, problematic situations may arise such as where the operation of the interface becomes disabled during the standby state due to the battery power level of the secondary battery decreasing as a result of the standby state continuing over a long period of time. One measure that can be taken so as to prevent the occurrence of such problematic situations is to charge the secondary battery as much as possible, for instance, to the full battery capacity of the secondary battery, when the secondary battery can be charged.

However, although it is highly uncertain as to when and how long the secondary battery can be charged as discussed above, when the secondary battery is charged to the full battery capacity so as to prevent such problematic situations as mentioned above from arising, another problem is brought about. That is, when the secondary battery is charged to its full battery capacity, a great load is exerted on the secondary battery, and accordingly, the life-span of the secondary battery is shortened. This problem is not unique to image forming apparatuses having the above described structure, and there is a possibility of the same problem occurring in electronic apparatuses in general. Here, reference is made to an electronic apparatus provided with a processing unit and a reception unit that operates on power supplied from a secondary battery, in which, when the reception unit receives a request for processing to be executed by the processing unit during the standby state, the processing unit commences operation and executes the processing requested.

SUMMARY OF THE INVENTION

In view of such problems, the present invention provides an electronic apparatus and an image forming apparatus that each realizes longevity of a secondary battery.

In specific, the present invention provides, as one aspect thereof, an electronic apparatus comprising: a main body that includes a reception unit and a processing unit, the reception unit receiving a processing request and the processing unit executing processing corresponding to the processing request; and a power supply device that is connected with an external power source and a secondary battery and that includes: a state switching unit that causes the power supply device to switch between a standby state for supplying power from the secondary battery to the reception unit without supplying power from the external power source to the main body and an operation state for supplying power from the external power source to the main body, the state switching unit causing the power supply device to switch between the standby state and the operation state such that, when a processing request is received by the reception unit while in the standby state, the state switching unit causes the power supply device to switch to the operation state, and subsequently, when execution of processing corresponding to the processing request is completed by the processing unit, the state switching unit causes the power supply device to return to the standby state; a charge unit that charges the secondary battery with power from the external power source; and a control unit that controls the charge unit such that, the charge unit is caused to commence charging of the secondary battery during the operation state, and the charge unit is caused to terminate charging of the secondary battery (i) when a value indicative of a present battery power level of the secondary battery reaches a threshold value denoted by Vt and (ii) when the power supply device returns to the standby state before the indicative value reaches Vt, wherein Vt satisfies $(V_L+V_s) \leq V_t < V_H$, where $V_L$ denotes a discharge lower limit of a battery power level of the secondary battery, $V_s$ denotes a decrease in the battery power level of the secondary battery occurring when power from the secondary battery is supplied to the reception unit for an estimated maximum duration of the standby state within a time period having a unit time length, and VH denotes a charge upper limit of the battery power level of the secondary battery.

The present invention provides, as another aspect thereof, an image forming apparatus comprising: a main body that includes a reception unit and an image forming unit, the reception unit receiving an image forming request and the image forming unit executing image forming corresponding to the image forming request; and a power supply device that is connected with an external power source and a secondary battery and that includes: a state switching unit that causes the power supply device to switch between a standby state for supplying power from the secondary battery to the reception unit without supplying power from the external power source to the main body and an operation state for supplying power from the external power source to the main body, the state switching unit causing the power supply device to switch between the standby state and the operation state such that, when an image forming request is received by the reception unit while in the standby state, the state switching unit causes the power supply device to switch to the operation state, and subsequently, when execution of image forming corresponding to the image forming request is completed by the image forming unit, the state switching unit causes the power supply device to return to the standby state; a charge unit that charges the secondary battery with power from the external power source; and a control unit that controls the charge unit such that, the charge unit is caused to commence charging of the secondary battery during the operation state, and the charge unit is caused to terminate charging of the secondary battery (i) when a value indicative of a present battery power level of the secondary battery reaches a threshold value denoted by Vt and (ii) when the power supply device returns to the standby state before the indicative value reaches Vt, wherein Vt satisfies (VL+Vs)≤Vt<VH, where VL denotes a discharge lower limit of a battery power level of the secondary battery, Vs denotes a decrease in the battery power level of the secondary battery occurring when power from the secondary battery is supplied to the reception unit for an estimated maximum duration of the standby state within a time period having a unit time length, and VH denotes a charge upper limit of the battery power level of the secondary battery.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 17 illustrates an example of a configuration of an operation history information table.

DESCRIPTION OF PREFERRED EMBODIMENTS

Description is provided in the following on embodiments of an electronic apparatus and an image forming apparatus pertaining to the present invention, with reference to the accompanying drawings.

Embodiment 1

(1) Structure of Image Forming Apparatus

Figure 1:
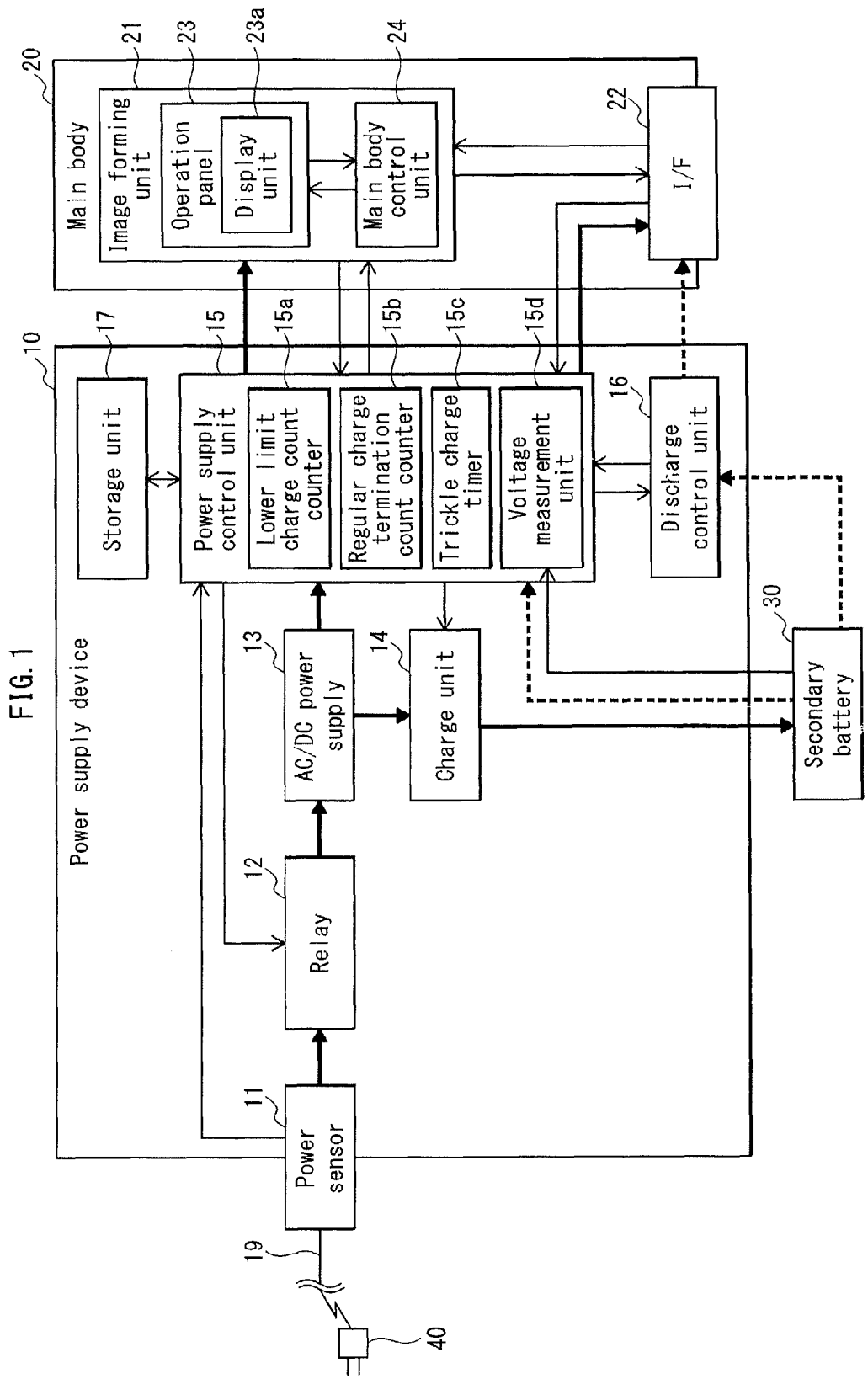
FIG. 1 is a block diagram describing a structure of an image forming apparatus in embodiment 1.

FIG. 1 is a block diagram describing a structure of an image forming apparatus in embodiment 1. The image forming apparatus is an MFP (Multiple Function Peripheral), which is capable of executing image forming jobs such as printing.

The image forming apparatus includes a power supply device 10 and a main body 20, as illustrated in FIG. 1.

The main body 20 includes an image forming unit (a processing unit) 21 and an external interface (an I/F; a reception unit) 22. The image forming unit 21 executes an image forming job of forming an image on a recording sheet based on image data. The I/F 22 is connected to a network (undepicted) such as a LAN and receives an instruction (a processing request) for executing an image forming job from an external terminal device, such as a personal computer, via the network.

The image forming unit 21 includes an operation panel 23 and a main body control unit 24, and executes image forming in accordance with, for instance, an electrophotographic printing method or an inkjet method.

The operation panel 23 receives input of various types of information from a user, and transmits the information so received to the main body control unit 24.

The main body control unit 24 causes a display unit 23a to display the information received from the operation panel 23. In addition, the main body control unit 24 controls execution of an image forming job according to an execution instruction for the image forming job received by the I/F 22.

The I/F 22 may be connected to the network via a wireless connection or a wired connection. Here, it is exemplary that the I/F 22 be connected to the network by utilizing a connection method realizing low power consumption. Examples of wireless technology realizing low power consumption include infrared communication, visible light communication, and body area network. In addition, examples of wireless communication standards include ZigBee, Z-Wave, and Bluetooth® low energy.

The power supply device 10, by utilizing a commercial power source (an external power source) and a secondary battery 30 as a driving source, executes control of supplying power supplied from the commercial power source to the main body 20, control of charge/discharge of the secondary battery 30, and the like. The power supply device 10 includes a power sensor 11, a relay 12, an AC/DC power supply 13, a charge unit 14, a power supply control unit 15, a discharge control unit 16, and a storage unit 17.

The power sensor 11 is a sensor for detecting alternating current power supplied from the commercial power source via a power supply line 19. The power supply line 19 is provided with a socket 40 and is connected to the commercial power source via the socket 40. The results of the detection by the power sensor 11 are received by the power supply control unit 15.

The relay 12 is a latching relay and switches between a power supply state and a power cutoff state in accordance with instructions from the power supply control unit 15. When the relay 12 is in the power supply state, alternating current power from the commercial power source is supplied to the AC/DC power supply 13. On the other hand, when the relay 12 is in the power cutoff state, alternating current power from the commercial power source is not supplied to the AC/DC power supply 13. Since the relay 12 is a latching relay as described above, when supply of power to the relay 12 is cut off after the relay 12 is caused to switch to a given state, the relay 12 remains in the given state.

The AC/DC power supply 13, when the relay 12 is in the power supply state, receives input of alternating current power from the commercial power source via the relay 12, converts alternating current power input thereto into direct current power, and supplies direct current power resulting from the conversion to the power supply control unit 15 and the charge unit 14.

The charge unit 14 charges the secondary battery 30 with direct current power supplied from the AC/DC power supply 13. The charging of the secondary battery 30 by the charge unit 14 is performed in accordance with instructions from the power supply control unit 15. The charge method according to which the charge unit 14 charges the secondary battery 30 is either rapid charge or trickle charge. The charge unit 14 switches between rapid charge and trickle charge according to the later-described conditions. In addition, when performing rapid charge of the secondary battery 30, the charge unit 14 terminates rapid charge when a battery voltage of the secondary battery 30 (referred to hereinafter as a "secondary battery voltage") rises and reaches a predetermined charge completion value Vt, as description is provided in the following.

The discharge control unit 16 either supplies power from the secondary battery 30 to the I/F 22 (i.e., causes discharge of the secondary battery 30) or cuts off supply of power from the secondary battery 30 to the I/F 22 (i.e., suspends discharge of the secondary battery 30) in accordance with instructions from the power supply control unit 15.

The power supply control unit 15 has overall control over the input and output of power to and from the power supply device 10, and includes a lower limit charge count counter 15a, a regular charge termination count counter 15b, a trickle charge timer 15c, and a voltage measurement unit 15d.

The lower limit charge count counter 15a counts a total number of times that the charge unit 14 has performed rapid charge of the secondary battery 30 as a result of the secondary battery voltage having dropped to a predetermined discharge suspension voltage VL.

The regular charge termination count counter 15b counts a total number of times that the charge unit 14 has terminated rapid charge of the secondary battery 30 due to the secondary battery voltage having risen to a charge completion value Vt as a result of rapid charge.

The trickle charge timer 15c measures a duration of trickle charge performed by the charge unit 14.

The voltage measurement unit 15d measures the secondary battery voltage.

The power supply control unit 15 receives direct current power from the AC/DC power supply 13, performs conversion of direct current power as necessary, and supplies direct current power to the main body 20. When the power supply control unit 15 supplies power to the main body 20, the main body 20 enters a state where execution of an image forming job is possible.

In addition to the above functions, the power supply control unit 15 performs exchange of signals with the main body 20. In specific, the power supply control unit 15 receives a later-described standby instruction from the main body control unit 24 and receives an execution instruction notification from the I/F 22. The execution instruction notification indicates that the I/F 22 has received an execution instruction for an image forming job.

Further in addition, the power supply control unit 15 detects that power is being supplied from the external power source by receiving a detection signal from the power sensor 11, and further, causes the relay 12 to switch between the power supply state and the power cutoff state.

The storage unit 17 stores information indicating a voltage value, such as the discharge suspension voltage VL, and the like.

The secondary battery 30 has one or more cells each capable of generating electricity and discharging (supplying) the electricity so generated. In specific, each cell includes a pair of electrodes and an electrolyte solution, and electricity is generated therein by electrochemical reactions taking place. Further, by electric current being applied between the pair of electrodes included in each cell, or that is, by being charged, the secondary battery 30 is capable of storing power therein. For instance, a nickel-metal hydride battery may be used as the secondary battery 30. However, the secondary battery 30 is not limited to this, and batteries of other types may also be used as the secondary battery 30.

In the image forming apparatus having the structure as described up to this point, the power supply control unit 15 performs switching control of causing the power supply device 10 to switch between an operation state and a standby state. During the operation state, power from the external power source is supplied to the main body 20 while power from the secondary battery 30 is not supplied to the main body 20. On the other hand, during the standby state, power from the external power source is not supplied to the main body 20 while power from the secondary battery 30 is supplied to the I/F 22. Here, note that the power supply control unit 15 itself operates on power supplied from the external power source via the AC/DC power supply 13 during the operation state, and operates on power supplied from the secondary battery 30 during the standby state.

The power supply control unit 15 switches the power supply device 10 from the operation state to the standby state when receiving a standby instruction from the main body control unit 24 of the main body 20 while the power supply device 10 is in the operation state.

On the other hand, the power supply control unit 15 switches the power supply device 10 from the standby state to the operation state when receiving an execution instruction notification from the I/F 22 of the main body 20 while the power supply device 10 is in the standby state.

When the power supply device 10 is switched to the operation state, the relay 12 switches to the power supply state, and power is supplied from the external power source to the main body 20 via the AC/DC power supply 13 and the power supply control unit 15 and from the external power source to the charge unit 14 via the AC/DC power supply 13. In the meantime, when the power supply device 10 is switched to the operation state, the supply of power from the secondary battery 30 to the I/F 22 is suspended.

When the power supply device 10 is switched to the standby state, the relay 12 switches to the power cutoff state, and power is not supplied from the external power source to the power supply control unit 15 and the like via the AC/DC power supply 13. In the meantime, when the power supply device 10 is switched to the standby state, power is supplied from the secondary battery 30 to the power supply control unit 15 and the I/F 22 (i.e., the secondary battery 30 is caused to discharge). In particular, power from the secondary battery 30 is supplied to the I/F 22 via the discharge control unit 16.

As such, during the operation state, the I/F 22 operates on power supplied to the main body 20 from the power supply control unit 15. On the other hand, during the standby state, the I/F 22 operates on power supplied from the secondary battery 30.

The power supply control unit 15, when switching the power supply device 10 from the standby state to the operation state, causes the relay 12 to switch to the power supply state, and issues an instruction and thereby causes the discharge control unit 16 to suspend the supply of power from the secondary battery 30 to the I/F 22. On the other hand, the power supply control unit 15, when switching the power supply device 10 from the operation state to the standby state, causes the relay 12 to switch to the power cutoff state, and issues an instruction and thereby causes the discharge control unit 16 to commence the supply of power from the secondary battery 30 to the I/F 22. In this sense, it could be said that the power supply control unit 15 functions as a state switching unit that causes switching between the standby state and the operation state.

In addition, during the operation state, the power supply control unit 15 determines whether or not charging of the secondary battery 30 is necessary according to the present the secondary battery voltage. Only when determining that charging of the secondary battery 30 is necessary, the power supply control unit 15 issues an instruction and thereby causes the charge unit 14 to execute charging of the secondary battery 30. In FIG. 1, arrows drawn in thick solid lines indicate power supply lines that are utilized during the operation state, whereas arrows drawn in thick broken lines indicate power supply line that are utilized during the standby state.

A standby instruction from the main body control unit 24 of the main body 20 to the power supply control unit 15 is issued when an image forming job has been completed, and is issued for each image forming job completed. Here, the timing at which a standby instruction is issued is not limited to the timing at which an image forming job completed. That is, when the main body 20 is configured to wait for reception of an execution instruction for executing a subsequent image forming job for a predetermined interval after the completion of a given image forming job, a standby instruction corresponding to the given image forming job may be issued when the predetermined interval has elapsed. Alternatively, the issuing of a standby instruction may be performed when a standby instruction issued by a user is received from the operation panel 23.

Further, description is provided in the following under the premise that (i) the power supply device 10 switches to the operation state by an operation state flag being set when the power supply control unit 15 receives an execution instruction notification from the I/F 22 while in the standby state, and (ii) the power supply device 10 switches to the standby state by a standby state flag being set when the power supply control unit 15 receives a standby instruction from the main body control unit 24 while in the operation state. Here, a standby instruction is issued by the main body control unit 24 when an image forming job is completed. Further, the switching between the operation state and the standby state, or in other words, the transition between states, is performed repeatedly. In addition, the operation state flag and the standby state flag are set in a predetermined region in the storage unit 17. More specifically, when one of the operation state flag and the standby state flag is set to the predetermined region, the other one of the operation state flag and the standby state flag is reset (is not set).

(2) Switching Control Between Operation State and Standby State

Figure 2:
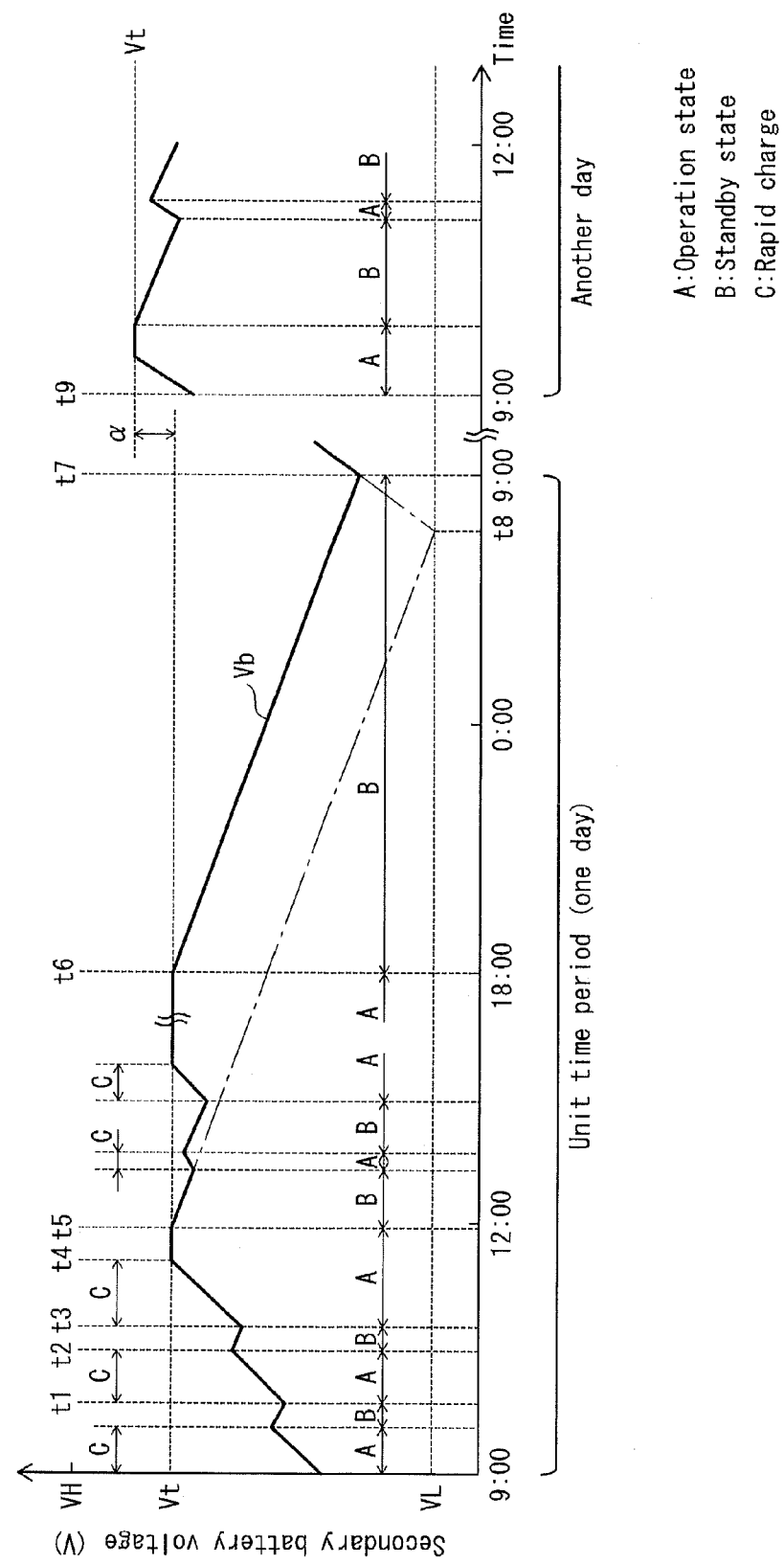
FIG. 2 is a schematic diagram illustrating an example of a change in a battery voltage of a secondary battery taking place over time by switching control between an operation state and a standby state.

FIG. 2 is a schematic diagram illustrating an example of a change in the secondary battery voltage taking place over time by switching control between the operation state and the standby state being performed.

In FIG. 2, a time period of 24 hours (i.e., one day) is set as a unit time period. Further, in FIG. 2, illustration is provided of intervals A, B, and C within a unit time period starting from 9 A.M. of the first day and ending at 9 A.M. of the second day. Each interval A indicates an interval corresponding to the operation state, each interval B indicates an interval corresponding to the standby state, and each interval C indicates an interval during which rapid charge of the secondary battery 30 is performed.

A corresponding image forming job is executed during the operation state. Further, when the secondary battery voltage Vb of the secondary battery 30 drops below the charge completion value Vt during the operation state, rapid charge of the secondary battery 30 is performed while the corresponding image forming job is being executed (for instance, refer to the time period between time point t1 and time point t2). As a result of the rapid charge of the secondary battery 30, the secondary battery voltage Vb rises.

A job execution time, which is a time period required for executing an image forming job, changes in accordance with the image forming job to be executed. For instance, the job execution time for an image forming job that is a print job of performing printing with respect to only several recording sheets is relatively short, whereas the job execution time for an image forming job that is a print job of performing continuous printing with respect to several hundred recording sheets is relatively long. In addition, when multiple image forming jobs are to be executed continuously, the job execution time required for executing the multiple image forming jobs corresponds to a time period from the commencement of the first image forming job to the completion of the last image forming job. As such, the job execution time in such a case is longer than the job execution time for a single image forming job.

Further, when a corresponding image forming job is completed before the secondary battery voltage Vb reaches the charge completion value Vt (for instance, refer to time point t2) during the operation state, rapid charge is terminated and the power supply device 10 switches to the standby state.

In the meantime, during the standby state, power from the secondary battery 30 is supplied to and thereby consumed by the I/F 22. As such, the secondary battery voltage Vb decreases (for instance, refer to the time period between time point t2 and time point t3).

Further, when an execution instruction for a new image forming job is received during the standby state, the power supply device 10 switches to the operation state (for instance, refer to time point t3). When the power supply device 10 switches to the operation state, the image forming job is executed, and when the secondary battery voltage Vb is lower than the charge completion value Vt, rapid charge of the secondary battery 30 is performed (for instance, refer to the time period between time point t3 and time point t4).

When the secondary battery voltage Vb rises to the charge completion value Vt as a result of rapid charge during the operation state (for instance, refer to time point t4), rapid charge is suspended even when the power supply device 10 is still in the operation state (for instance, refer to the time point between time point t4 and time point t5). Due to rapid charge being suspended in such a manner, the secondary battery voltage Vb is prevented from exceeding the charge completion value Vt.

As illustrated in FIG. 2, when execution instructions for image forming jobs are issued frequently by users during business hours, which typically begins in the morning (9 A.M. or later) and ends in the evening, the power supply control unit 15 performs the switching between the operation state and the standby state on a frequent basis.

In contrast, later in the evening, for instance, after time point t6 (6 P.M.), execution instructions for image forming jobs are rarely issued by users, and accordingly, the power supply device 10 is in the standby state for most of the time. When the power supply device 10 is in the standby state for most of the time, or that is, when the power supply device 10 rarely switches to the operation state, rapid charge of the secondary battery 30 is rarely performed. Due to this, and since the secondary battery 30 discharges, or that is, since the secondary battery 30 supplies power to the I/F 22 during the standby state, the secondary battery voltage Vb continues to decrease (for instance, refer to the time period between time point t6 and time point t7).

Following this, in the morning of the next day, for instance, at time point t7 (9 A.M.), execution instructions for image forming jobs start to be frequently issued by users due to business hours starting. At this point where the business hours start, the secondary battery voltage Vb is lower than the charge completion value Vt. As such, rapid charge of the secondary battery 30 is performed when an image forming job is executed (for instance, refer to the time period starting from time point t7).

The cycle of operations as described above is repeated in units of single days. Here, it should be noted that image forming jobs are executed in response to user instructions, which are issued on an irregular basis. As such, it is highly uncertain as to when and how frequently rapid charge of the secondary battery 30 can be performed.

In view of such circumstances, there is a risk of a situation arising where the secondary battery 30 cannot be charged sufficiently and as a result, the secondary battery voltage Vb decreases excessively during, for instance, a time period between time point t6 and t7. When such a situation arises, the operation of the I/F 22 is disabled, and the I/F 22 is unable to receive execution instructions for image forming jobs issued from the outside thereafter. As a result, the execution of image forming jobs will be impossible.

A preventive measure for preventing such a situation from taking place would be to charge the secondary battery 30 to the full battery capacity when rapid charge of the secondary battery 30 can be performed (for instance, refer to the time period between 9 A.M. and 6 P.M. in FIG. 2), taking into consideration the fact that it is highly uncertain as to when and how frequently rapid charge of the secondary battery 30 can be performed. However, as described above, rapid charge of the secondary battery 30 to the full battery capacity results in the life-span of the secondary battery 30 being shortened.

Taking the above-described problems into consideration, so as to realize longevity of the secondary battery 30 while preventing situations from occurring where the execution of an image forming job is impossible while the power supply device 10 is in the operation state, the charge completion value Vt is to be set as described in the following. The charge completion value Vt is to be set such that, when rapid charge of the secondary battery 30 is performed to the charge completion value Vt, (i) the residual battery capacity level of the secondary battery 30 does not exceed a certain battery capacity level that, when exceeded, shortens the life-span of the secondary battery 30 and (ii) the secondary battery 30 is charged to a battery voltage corresponding to a minimum battery capacity level that ensures that a battery capacity shortage does not occur by power from the secondary battery 30 being supplied to the I/F 22 during the standby state.

Figure 3:
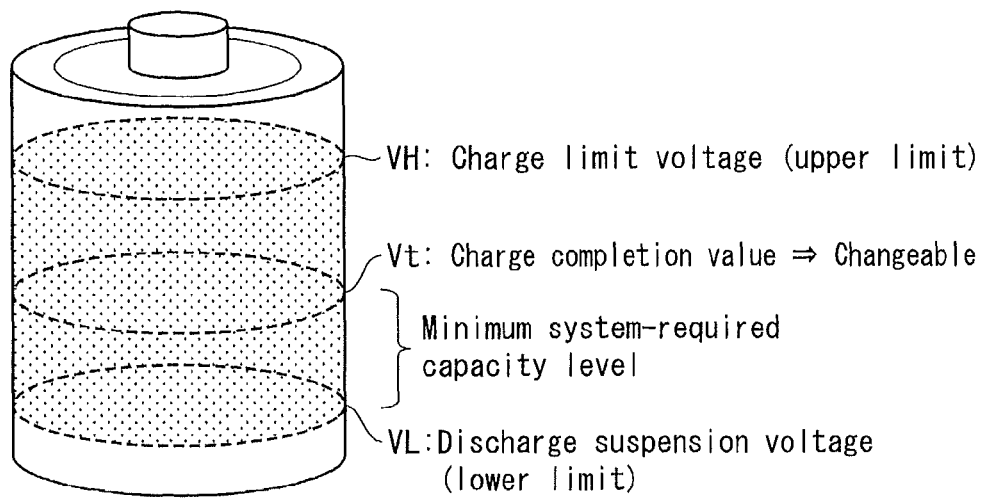
FIG. 3 is a schematic diagram illustrating a relationship between levels of a maximum charge voltage, a discharge suspension voltage, and a charge completion value of the secondary battery.

As such, in the present embodiment, the charge completion value Vt of the secondary battery 30 is set so as to satisfy (VL+Vs)≤Vt<VH (a predetermined appropriate range). As illustrated in the schematic diagram in FIG. 3, VH denotes a charge limit voltage (a charge upper limit) of the secondary battery 30, VL denotes a discharge suspension voltage (a discharge lower limit), and Vs denotes a decrease in battery voltage (minimum system-required capacity level) of the secondary battery 30 taking place when power from the secondary battery 30 is supplied to the I/F 22 for a estimated maximum duration Ta. Here, the estimated maximum duration Ta indicates the estimated maximum duration of the standby state within a unit time period (i.e., one day), and is, for instance, 23 hours in a case where it can be estimated that the power supply device 10 will be in the operation state for only one hour within the unit time period.

More specifically, the charge limit voltage VH is a value indicating a charge upper limit such that the life-span of the secondary battery 30 is shortened when charging of the secondary battery 30 is continued exceeding the limit, and is determined in advance according to characteristics of the secondary battery 30 and the like. For instance, the charge limit voltage VH is around 1.6 V when the secondary battery 30 has a single cell structure.

The discharge suspension voltage VL is a value indicating a discharge lower limit such that the life-span of the secondary battery 30 is shortened when discharge of the secondary battery 30 is continued exceeding the limit, and is determined in advance according to characteristics of the secondary battery 30 and the like. In connection with the discharge suspension voltage VL, the I/F 22 utilized in the present embodiment is able to operate even when the secondary battery voltage Vb drops to the discharge suspension voltage VL. For instance, the discharge suspension voltage VL is around 1.0 V when the secondary battery 30 has a single cell structure. In addition, the discharge suspension voltage is referred to as the lower limit value VL in the following.

The minimum system-required capacity level Vs can be determined, for instance, as follows.

A discharge amount Wt of the secondary battery 30 within the estimated maximum duration Ta can be determined by multiplying an hourly discharge amount Wa of the secondary battery 30 (corresponding to the power consumption amount per hour of the I/F 22) and the estimated maximum duration Ta. The discharge amount Wt indicates discharge of the secondary battery 30 caused by supplying power to the I/F 22. For instance, when the discharge amount Wa is 30 mW and the estimated maximum duration Ta is 23 hours, the discharge amount Wt is calculated as 690 mW.

By determining the correlation between the discharge amount of the secondary battery 30 and the resulting decrease in the secondary battery voltage in advance, the calculation of the minimum system-required capacity level Vs, which is a value indicating the decrease in battery voltage of the secondary battery 30 that takes place when the secondary battery 30 discharges the discharge amount Wt, is possible.

Note that the estimated maximum duration Ta changes in accordance with the duration of the standby state within a unit time period. Further, the duration of the standby state changes in accordance with the duration of the operation state, or that is, the duration of job execution times required for executing image forming jobs.

As description has been provided above, image forming jobs are executed in response to user instructions. As such, the total duration of job execution times required for executing image forming jobs within a unit time period of a single day is not always the same. However, estimation can be made such that the total duration of job execution times required for executing image forming jobs within a unit time period of a single day changes within a range between, for instance, a minimum of one hour and a maximum of three hours. Accordingly, the estimated maximum duration Ta of the standby state of the power supply device 10 can be determined as a duration (e.g., 23 hours) that is calculated by subtracting a minimum duration of the operation state that can at least be secured within a unit time period (e.g., one hour) from a unit time period of 24 hours.

In an ordinary office or the like, the duration of the operation state within a single day is likely to be, for instance, around several hours. By investigating, in advance, the fluctuation in the duration of the operation state from day to day, the estimated maximum duration Ts of the standby state can be determined and set in advance in accordance with the range of fluctuation.

By setting the charge completion value Vt in the above-described manner, it can be ensured that, the secondary battery voltage Vb is equal to or greater than the lower limit value VL at a point where a standby state continuing for 23 hours terminates, provided that the secondary battery 30 has been charged during the operation state immediately preceding the 23-hour-long standby state so that the secondary battery voltage Vb reaches the charge completion value Vt. In this sense, the charge completion value Vt is a value indicating a battery voltage corresponding to a battery capacity level of the secondary battery 30 that ensures the execution of operations during the standby state.

As such, when the charge completion value Vt is set in the above-described manner, a situation is prevented where the secondary battery voltage Vb drops below the lower limit value VL during the standby state. Accordingly, the main body 20 is able to receive execution instructions for image forming jobs from the outside during the standby state and execute the image forming jobs.

Note that, depending upon the environment in which the apparatus is used, there may be cases where the power supply device 10 switches to the operation state at an extremely low frequency, and accordingly, the secondary battery voltage Vb drops below the lower limit value VL during the standby state due to the secondary battery 30 not being charged sufficiently during the operation state.

In such cases, an exceptional measure is taken of performing rapid charge even during the standby state so as to reduce the load exerted on the secondary battery 30 by the secondary battery 30 continuing discharge at a battery voltage lower than the lower limit value VL. Such a measure is considered as being exceptional since in the present embodiment, the charging of the secondary battery 30 is basically performed only during the operation state.

The graph illustrated in chained lines in FIG. 2 indicates the above-described rapid charge performed as an exceptional measure (refer to time point t8). Note that the above-described rapid charge, which is performed as an exceptional measure, is also suspended when the secondary battery voltage Vb reaches the charge completion value Vt, similar to rapid charge performed in normal cases.

In connection with the charge completion value Vt, as description has been provided above, the charge completion value Vt is to be set within the predetermined appropriate range. However, it is particularly desirable that the charge completion value Vt be set to a value as close as possible to the lower limit value VL within the predetermined appropriate range.

This is since, a phenomenon that is commonly referred to as the memory effect is one characteristic of the secondary battery 30. The memory effect is a phenomenon taking place when the secondary battery 30 is repeatedly charged after only partial discharge, or that is, when the residual battery capacity level of the secondary battery 30 is still high. When the memory effect takes place, the discharge voltage of the secondary battery 30 falls prominently even though the secondary battery 30 has not been discharged to a sufficient extent, and hence, it seems as though the capacity of the secondary battery 30 has decreased.

So as to suppress the occurrence of the memory effect as much as possible, it is effective to charge the secondary battery 30 after the secondary battery 30 has been discharged until not much of the capacity of the secondary battery 30 is remaining (i.e., until the battery voltage drops to around the lower limit value VL) rather than charging the secondary battery 30 when the residual battery capacity level of the secondary battery 30 is still high.

The battery capacity level to which the secondary battery 30 can be charged increases as the charge completion value Vt is set to a higher voltage. As such, it is desirable that the charge completion value Vt be set to a value as close as possible to the lower limit value VL within the predetermined appropriate range since, when presuming that discharge of the secondary battery 30 is performed under the same conditions in a case where the charge completion value Vt is set to a relatively high voltage and in a case where the charge completion value Vt is set to a relatively low voltage, the residual battery capacity level of the secondary battery 30 after elapse of a given time period from the start of discharge will be low when the charge completion value Vt is set to a low voltage, compared to when the charge completion value Vt is set to a high voltage.

In addition, the memory effect can be overcome to a great extent by performing sufficient discharge of the secondary battery 30 (an operation commonly referred to as "refreshing"). Taking this into consideration, by setting the charge completion value Vt to a relatively low voltage, the likelihood of the secondary battery voltage Vb dropping to a battery voltage corresponding to a low residual battery capacity level (a voltage close to the lower limit value VL) upon discharge increases, and due to this, even when the memory effect takes place, discharge of the secondary battery 30 can be performed sufficiently and the memory effect can be overcome.

For the reasons described above, it is desirable that the charge completion value Vt be set to a low value as possible within the predetermined appropriate range while providing a margin of a certain level so as to ensure that the secondary battery voltage Vb does not drop below the lower limit value VL.

(3) Control of Changing Charge Completion Value Vt

As description has been provided above, the charge completion value Vt is set to be within the above-described predetermined appropriate range. In the present embodiment, control is performed of changing the level of the charge completion value Vt over time as illustrated in FIG. 2.

In specific, the charge completion value Vt for another day (refer to time point t9) that follows one day that is the unit time period in FIG. 2 is set to be higher in voltage by α compared to the charge completion value Vt for the day that is the unit time period. Reasons for setting the charge completion value Vt in such a manner are described in the following.

When the secondary battery 30 is used continuously over a long period of time, for instance for several months or several years, gradual degradation of the secondary battery 30 occurs. When attempting to maintain the output power of the secondary battery 30 at a level of a brand new secondary battery 30 even after a long period of use, it is necessary to raise the charge completion value Vt to increase the battery capacity level to which the secondary battery 30 can be charged so as to compensate for the above-described degradation.

Further, the determination of whether or not to change (raise) the charge completion value Vt is made according to a lower limit charge count and a regular charge termination count, which are information on the charge/discharge of the secondary battery 30.

(4) Lower Limit Charge Count and Regular Charge Termination Count

Figure 4:
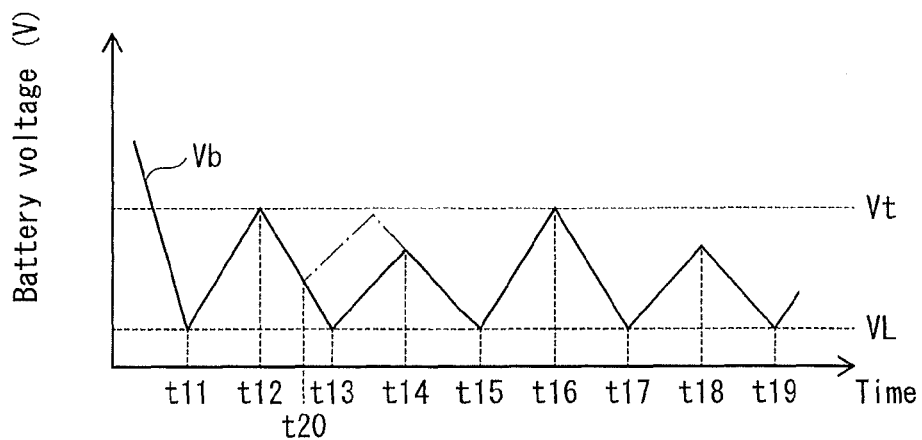
FIG. 4 is a diagram describing a lower limit charge count counted by a lower limit charge count counter and a regular charge termination count counted by a regular charge termination count counter.

FIG. 4 is a diagram describing the lower limit charge count counted by a lower limit charge count counter 15a and the regular charge termination count counted by a regular charge termination count counter 15b. More specifically, FIG. 4 illustrates a change of the secondary battery voltage taking place over time by charge and discharge of the secondary battery 30. In FIG. 4, each interval; during which a rise in the secondary battery voltage is observed is an interval during which rapid charge of the secondary battery 30 is performed, whereas each interval during which a drop in the secondary battery voltage is observed is an interval during which the secondary battery 30 is discharged.

In the example illustrated in FIG. 4, each of time points t11, t13, t15, t17, and t19 is a time point where rapid charge of the secondary battery 30 is commenced due to the secondary battery voltage Vb having dropped to the lower limit value VL. The total number of times rapid charge is performed at such time points is counted as the lower limit charge count Q. Here, note that time point t20, at which rapid charge is commenced before the secondary battery voltage Vb drops to the lower limit value VL as indicated by the chained line, is not counted in the lower limit charge count Q.

In addition, in the example illustrated in FIG. 4, each of time points t12 and t16 is a time point at which rapid charge is terminated due to the secondary battery voltage Vb rising to the charge completion value Vt. The total number of times rapid charge is terminated in such a manner at such time points is counted as the regular charge termination count P. Here, note that, at each of time points t14 and t18, rapid charge is terminated (suspended) before the secondary battery voltage Vb reaches the charge completion value Vt, and the secondary battery 30 is caused to discharge. Therefore, such time points are not counted in the regular charge termination count P. Since both the regular charge termination count P and the lower limit charge count Q change according to the number of times charging has been performed of the secondary battery 30, both are considered as information indicating the number of times charging has been performed with respect to the secondary battery 30.

A great value for the lower limit charge count Q indicates that the secondary battery voltage Vb has dropped to the lower limit value VL for a large number of times. Here, it should be noted that, although the lower limit value VL is a threshold value on the low limit side of the battery power level of the secondary battery 30 defined as a boundary between a range within which the life-span of the secondary battery 30 is affected and a range within which the life-span of the secondary battery 30 is not affected, it does not follow that absolutely no load is exerted on the secondary battery 30 when the secondary battery voltage Vb equals the lower limit value VL. That is, actually, it cannot be denied that a certain level of load is exerted on the secondary battery 30 when the secondary battery voltage Vb is equal to the lower limit value VL. In other words, the secondary battery 30 is in a state where degradation is likely to progress when the secondary battery voltage Vb equals the lower limit value VL.

Taking this into account, it can be said that the probability is high of the degradation of the secondary battery 30 being in progress when the lower limit charge count Q indicates a great value. Taking this into account, the output power of the secondary battery 30 can be stabilized over a long period of time by performing control of changing the charge completion value Vt in accordance with the increase of the value indicated by the lower limit charge count Q, or that is, in accordance with the progress of the degradation of the secondary battery 30.

Similarly, a great value for the regular charge termination count P indicates that the total duration of rapid charge performed with respect to the secondary battery 30 has reached a great amount of time, and therefore, load is being exerted on the secondary battery 30. As such, the output power of the secondary battery 30 can also be stabilized over a long period of time by performing control of changing the charge completion value Vt in accordance with the increase of the value indicated by the regular charge termination count P, instead of the lower limit charge count Q.

As description has been provided above, the regular charge termination count P or the lower limit charge count Q may be used for determining whether or not to perform the control of changing the charge completion value Vt. However, the condition based on which the determination is made of whether or not to perform the control of changing the charge completion value Vt is not limited to the above, and any parameter relating to the life-span of the secondary battery 30 may be used.

For instance, the control of changing the charge completion value Vt may be performed (i) when one of the regular charge termination count P and the lower limit charge count Q indicating a greater value reaches a predetermined value n11 before the other or (ii) when one of the regular charge termination count P and the lower limit charge count Q indicating a smaller value reaches a predetermined value n12 before the other.

Alternatively, the control of changing the charge completion value Vt may be performed (i) when a sum R of the regular charge termination count P and the lower limit charge count Q reaches a predetermined value R0 or (ii) when an average U calculated by dividing the sum R by two reaches a predetermined value U0. In the present embodiment, the determination of whether or not to change the charge completion value Vt is performed by using the sum R.

The determination of which of the above-described conditions is to be applied and the determination of the extent to which the charge completion value Vt is to be raised is to be made appropriately by taking into consideration such aspects as the performance, the period of use, and the life-span of the secondary battery 30 and by conducting experiments or the like in advance. Concerning the voltage (α) by which the charge completion value Vt is to be raised, an alternative structure may be employed of setting a fixed voltage α regardless of the life-span of the secondary battery 30 or of setting a greater or smaller voltage α as the secondary battery 30 approaches the end of the life-span.

In addition, since there may be cases where the secondary battery 30, due to degradation, cannot be charged to a required battery capacity level even when charging is performed for the same period of time as a brand new secondary battery 30, alternative structures as described in the following may be employed. That is, (i) a charge current value for charging the secondary battery 30 may be changed, for instance, such that the charge current value is made greater every time the charge completion value Vt is updated, or (ii) when a predetermined time limit is set during which charging of the secondary battery 30 is to be performed, the time limit may be changed such that the time limit is extended every time the charge completion value Vt is updated.

Only one of the above-described alternative structures may be employed or a plurality of the above-described alternative structures may be employed in any combination thereof. In addition, note that information such as the lower limit value VL, the charge limit voltage VH, the charge completion value Vt, the predetermined value n11 and the like are stored in the storage unit 17.

(5) Charge/Discharge Control During Standby State and Operation State

Figure 5:
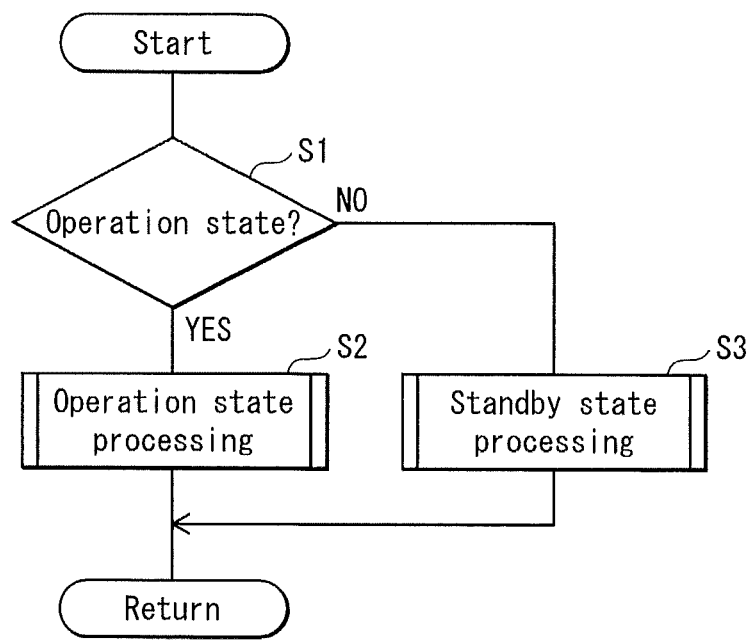
FIG. 5 is a flowchart illustrating charge/discharge control by a power supply control unit.
Figure 15:
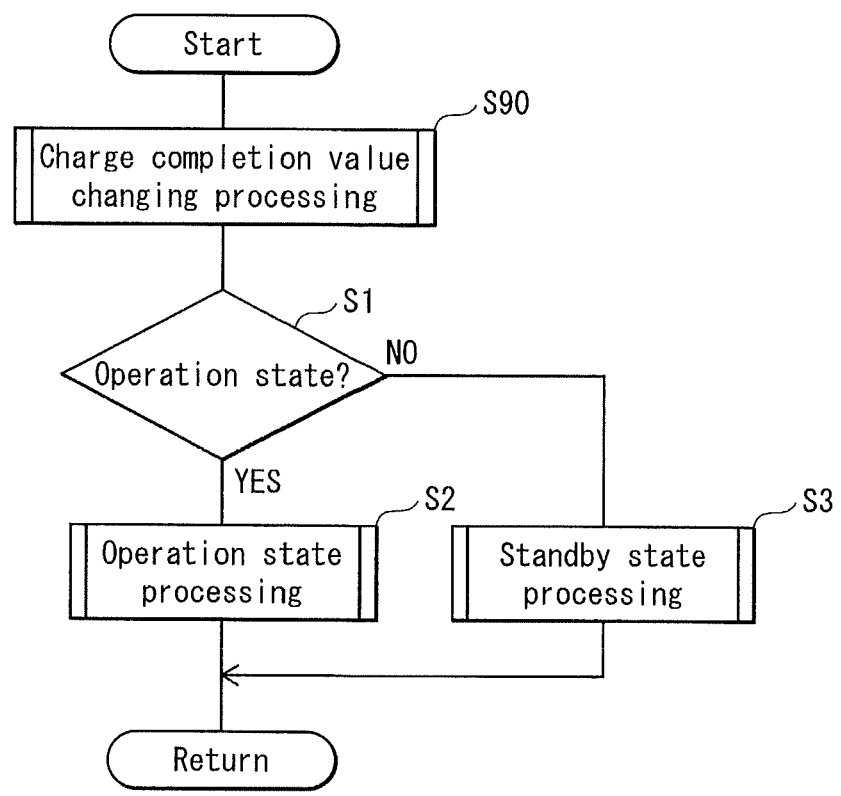
FIG. 15 is a flowchart illustrating processing incorporating charge completion value changing processing.

FIG. 5 is a flowchart illustrating charge/discharge control performed by the power supply control unit 15. The processing illustrated in FIG. 15 is repeatedly performed in response to calls from an undepicted main routine.

As illustrated in FIG. 5, the power supply control unit 15 determines whether or not the power supply device 10 is in the operation state (Step S1). The power supply control unit 15 determines that the power supply device 10 is in the operation state when the operation state flag is set to the predetermined region.

When determining that the power supply device 10 is in the operation state ("YES" in Step S1), the power supply control unit 15 executes operation state processing (Step S2). Following the execution of the operation state processing, processing returns to the main routine. In contrast, when determining that the power supply device 10 is not in the operation state, or in other words, when determining that the power supply device 10 is in the standby state ("NO" in Step S1), the power supply control unit 15 executes standby state processing (Step S3). The power supply control unit 15 determines that the power supply device 10 is in the standby state when the standby state flag is set to the predetermined region. Following the execution of the standby state processing, processing returns to the main routine.

(5-1) Operation State Processing

Figure 6:
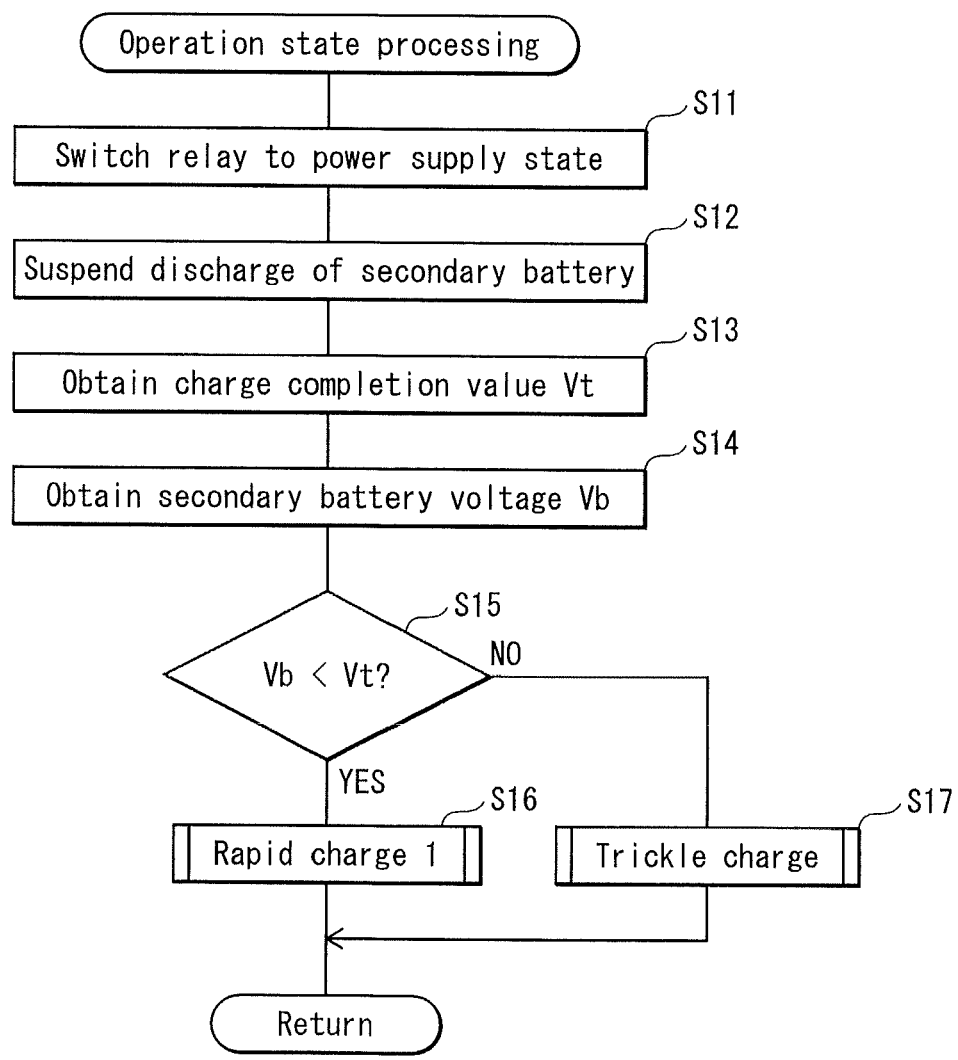
FIG. 6 is a flowchart illustrating a subroutine corresponding to operation state processing.

FIG. 6 is a flowchart illustrating a subroutine corresponding to the operation state processing.

As illustrated in FIG. 6, the power supply control unit 15 switches the relay 12 to the power supply state (Step S11) and suspends the supply of power from the secondary battery 30 to the I/F 22 (i.e., suspends discharge of the secondary battery 30) (Step S12). The suspension of discharge of the secondary battery 30 is performed by the power supply control unit 15 issuing an instruction for suspension of discharge to the discharge control unit 16.

Subsequently, the power supply control unit 15 obtains the charge completion value Vt (Step S13). More specifically, the power supply control unit 15 obtains the charge completion value Vt by reading information indicating the charge completion value Vt from the storage unit 17. In the present embodiment, updating of the charge completion value Vt is performed in charge completion value update processing (Steps S26, S63, and S68), description of which is provided in the following. More specifically, every time the updating of the charge completion value Vt is performed, the charge completion value Vt is overwritten to a new value. As such, the power supply control unit 15 reads the charge completion value Vt at the present time point from the storage unit 17 in Step S13.

Subsequently, the power supply control unit 15 obtains the secondary battery voltage Vb (Step S14). In specific, the power supply control unit 15 obtains the secondary battery voltage Vb by obtaining a voltage value measured by the voltage measurement unit 15d.

Following this, the power supply control unit 15 determines whether or not the secondary battery voltage Vb is smaller than the charge completion value Vt (Step S15). When Vb<Vt ("YES" in Step S15), the power supply control unit 15 causes rapid charge 1 to be performed (Step S16). When rapid charge 1 is completed, processing returns to the subroutine in FIG. 5. In contrast, when Vb≥Vt ("NO" in Step S15), the power supply control unit 15 causes trickle charge to be performed (Step S17). When trickle charge is completed, processing returns to the subroutine in FIG. 5.

(5-2) Rapid Charge 1

Figure 7:
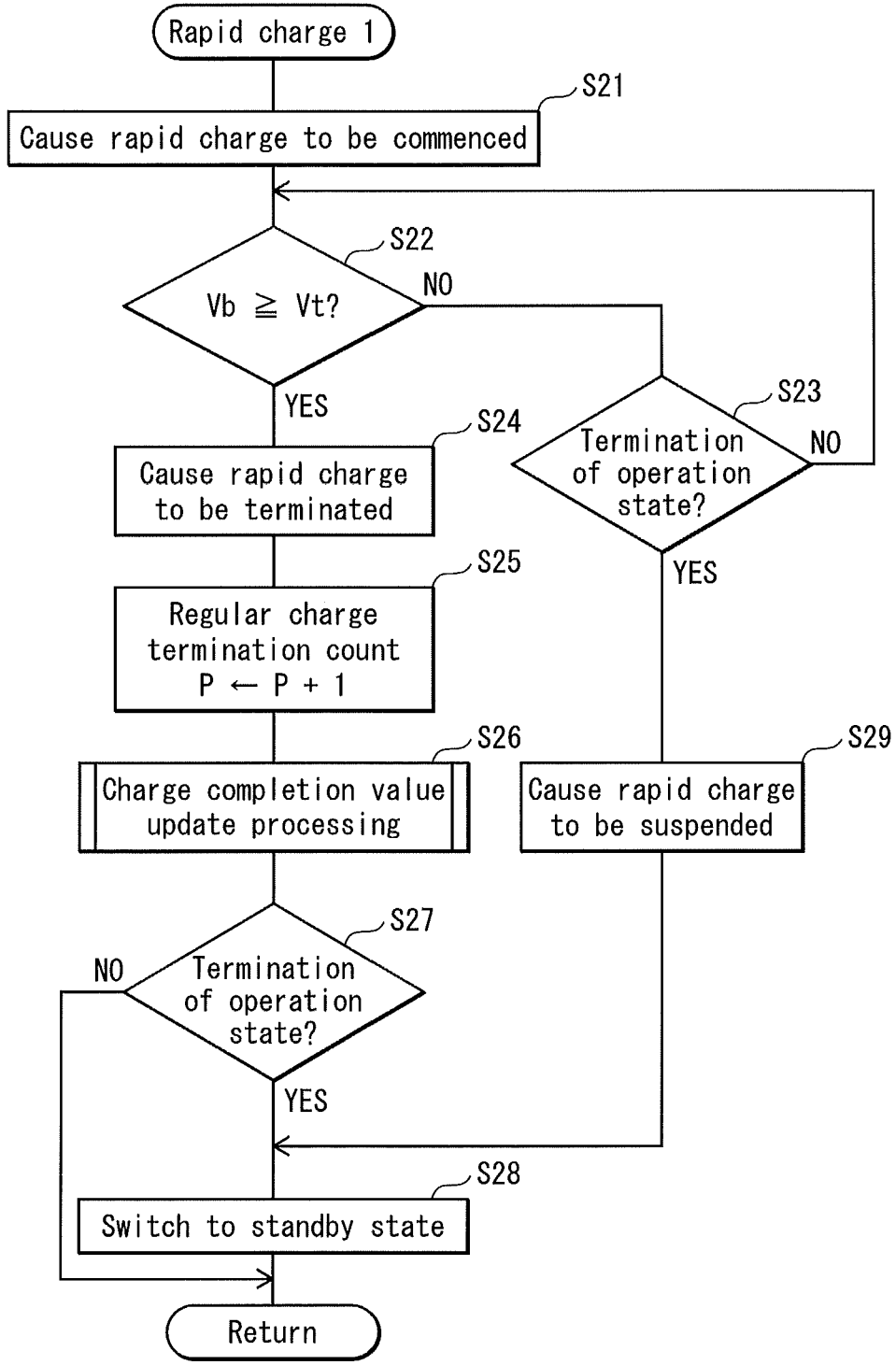
FIG. 7 is a flowchart illustrating a subroutine corresponding to rapid charge 1.

FIG. 7 is a flowchart illustrating a subroutine corresponding to rapid charge 1.

As illustrated in FIG. 7, the power supply control unit 15 causes rapid charge of the secondary battery 30 to be commenced (Step S21) (corresponding to time points t1 and t3 in FIG. 2). For instance, pulse charging is utilized as the method for rapid charge of the secondary battery 30. However, the method utilized for charging the secondary battery 30 need not be a method for rapid charge, and other methods may be utilized provided that the secondary battery voltage Vb rises to the charge completion value Vt. Further, the power supply control unit 15 causes rapid charge to be commenced by issuing an instruction for commencing rapid charge to the charge unit 14.

Subsequently, the power supply control unit 15 determines whether or not the secondary battery voltage Vb is equal to or greater than the charge completion value Vt (Step S22).

When Vb<Vt ("NO" in Step S22), the power supply control unit 15 determines termination or non-termination of the operation state (Step S23). The power supply control unit 15 determines termination of the operation state when determining that the flag set to the predetermined region has changed from the operation state flag to the standby state flag.

When determining non-termination of the operation state ("NO" in Step S23), the power supply control unit 15 returns to the processing in Step S22. When rapid charge is in progress and the power supply control unit 15 determines that Vb≥Vt is not satisfied and determines non-termination of the operation state, the processing in Steps S22 and S23 is repeatedly performed until the power supply control unit 15 determines that Vb≥Vt is satisfied or the power supply control unit 15 determines termination of the operation state.

When rapid charge is in progress and the power supply control unit 15 determines that Vb≥Vt is satisfied ("YES" in Step S22), the power supply control unit 15 causes rapid charge to be terminated (Step S24) (corresponding to time point t4 in FIG. 2).

Subsequently, the power supply control unit 15 updates the regular charge termination count P by setting a value obtained by incrementing the present regular charge termination count P by one as the new regular charge termination count P (Step S25). The updating of the regular charge termination count P is performed by the regular charge termination count counter 15b counting up by one count from the present regular charge termination count P.

Subsequently, the power supply control unit 15 executes the charge completion value update processing (Step S26).

Figure 8:
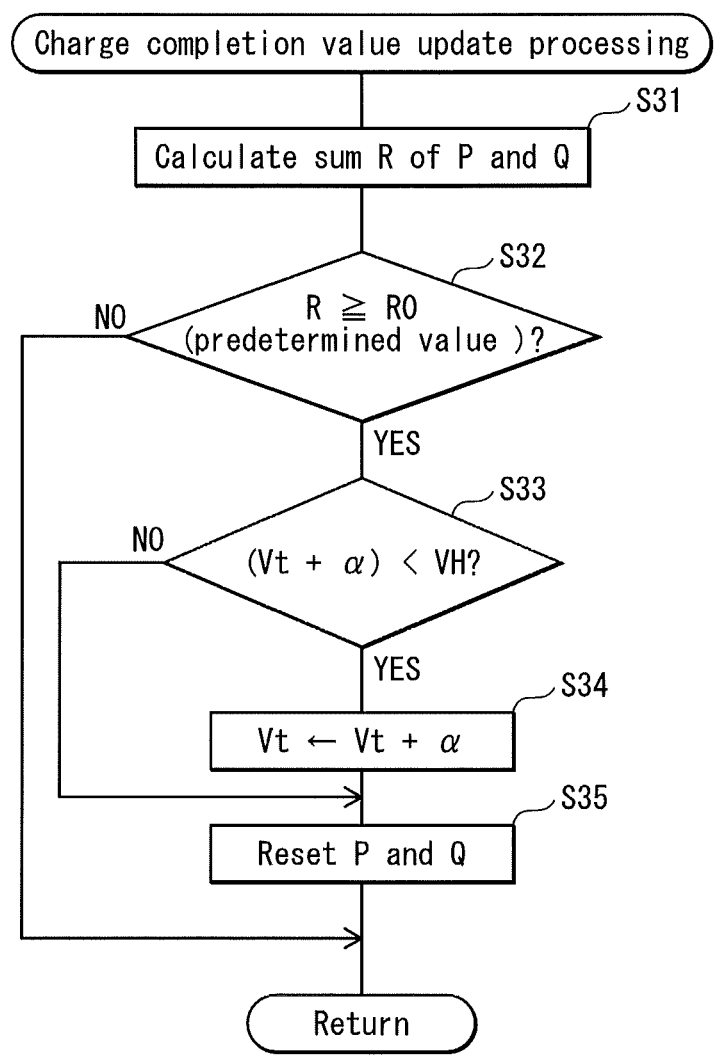
FIG. 8 is a flowchart illustrating a subroutine corresponding to charge completion value update processing.

FIG. 8 is a flowchart illustrating a subroutine corresponding to the charge completion value update processing.

As illustrated in FIG. 8, the power supply control unit 15 calculates a sum R of the present regular charge termination count P and the lower limit charge count Q (Step S31).

Subsequently, the power supply control unit 15 determines whether or not the sum R is equal to or greater than the predetermined value R0 (Step S32). As description has been provided above, the predetermined value R0 is stored in the storage unit 17, and is a preset value that is appropriate as the condition to be satisfied for performing the control of changing the charge completion value Vt.

When R≥R0 ("YES" in Step S32), the power supply control unit 15 determines that the condition for performing the control of changing the charge completion value Vt has been satisfied. As such, the power supply control unit 15 determines whether a value calculated by adding the predetermined value α to the present charge completion value Vt is smaller than the charge limit voltage VH (Step S33).

When determining that the value calculated by adding the predetermined value α to the present charge completion value Vt is smaller than the charge limit voltage VH ("YES" in Step S33), the power supply control unit 15 updates the charge completion value Vt by setting the value calculated by adding the predetermined value α to the present charge completion value Vt as the new charge completion value Vt (Step S34). The updating of the charge completion value Vt is performed by deleting data corresponding to the charge completion value Vt that is presently written to the storage unit 17 and writing, to the storage unit 17, the new charge completion value Vt.

Subsequently, the power supply control unit 15 resets the regular charge termination count P and the lower limit charge count Q to zero (Step S35). Following this, processing returns to the subroutine in FIG. 7. The regular charge termination count P and the lower limit charge count Q are reset so as to newly calculate, form zero, the regular charge termination count P and the lower limit charge count Q for the updated charge completion value Vt.

Note that, when determining that the value calculated by adding the predetermined value α to the present charge completion value Vt is not smaller than the charge limit voltage VH, or that is, when determining that the value calculated by adding the predetermined value α to the present charge completion value Vt is equal to or greater than the charge limit voltage VH ("NO" in Step S33), the power supply control unit 15 skips (does not execute) the processing in Step S34, and proceeds to the processing in Step S35. In this case, the charge completion value Vt is restricted from exceeding the charge limit voltage VH as a result of the updating.

On the other hand, when R<R0 ("NO" in Step S32), the power supply control unit 15 determines that the condition to be satisfied to perform the control of changing the charge completion value Vt has not been satisfied. As such, the power supply control unit 15 skips (does not execute) the processing in Steps S33 through S35. Following this, processing returns to the subroutine in FIG. 7.

Note that in the above, description has been provided on an example of a structure where, as the condition to be satisfied for performing the control of changing the charge completion value Vt, the sum R of the regular charge termination count P and the lower limit charge count Q is used. However, when the control of changing the charge completion value Vt is to be performed when one of the regular charge termination count P and the lower limit charge count Q indicating a greater value reaches a predetermined value before the other, instead of the processing of calculating the sum R in the above-described example, a comparison is made to determine which of the regular charge termination count P and the lower limit charge count Q indicates a greater value, and further, the necessity of updating the charge completion value Vt is determined by judging whether or not the one of the regular charge termination count P and the lower limit charge count Q indicating a greater value, which is determined through the above-described comparison, is equal to or greater than a predetermined value. In addition, other conditions may be applied as the condition to be satisfied for performing the control of changing the charge completion value Vt, and in such cases, the necessity of updating the charge completion value Vt is to be determined in accordance to the condition applied.

Returning to the subroutine in FIG. 7, the power supply control unit 15 determines termination or non-termination of the operation state in Step S27. The determination in Step S27 is performed according to the same method as applied in Step S23.

When determining non-termination of the operation state ("NO" in Step S27), processing returns to the subroutine in FIG. 6. In the above-described case, the secondary battery voltage Vb has already reached the charge completion value Vt once at this point. Due to this, when the operation state processing is executed once again after one iteration of the main routine is completed, a determination is made of Vb≥Vt in Step S15, and accordingly, the power supply control unit 15 causes trickle charge in Step S17 to be executed.

When determining termination of the operation state ("YES" in Step S27), the power supply control unit 15 causes the power supply device 10 to switch to the standby state (Step S28) (corresponding to time points t5 and t6 in FIG. 2), and processing returns to the subroutine in FIG. 6.

On the other hand, when the operation state of the power supply device 10 is to be terminated while rapid charge is in progress ("YES" in Step S23), the power supply control unit 15 causes rapid charge of the secondary battery 30 to be suspended (Step S29) (corresponding to time point t2 in FIG.

2), and causes the power supply device 10 to switch to the standby state in Step S28. Subsequently, processing returns to the subroutine in FIG. 6.

(5-3) Trickle Charge

Figure 9:
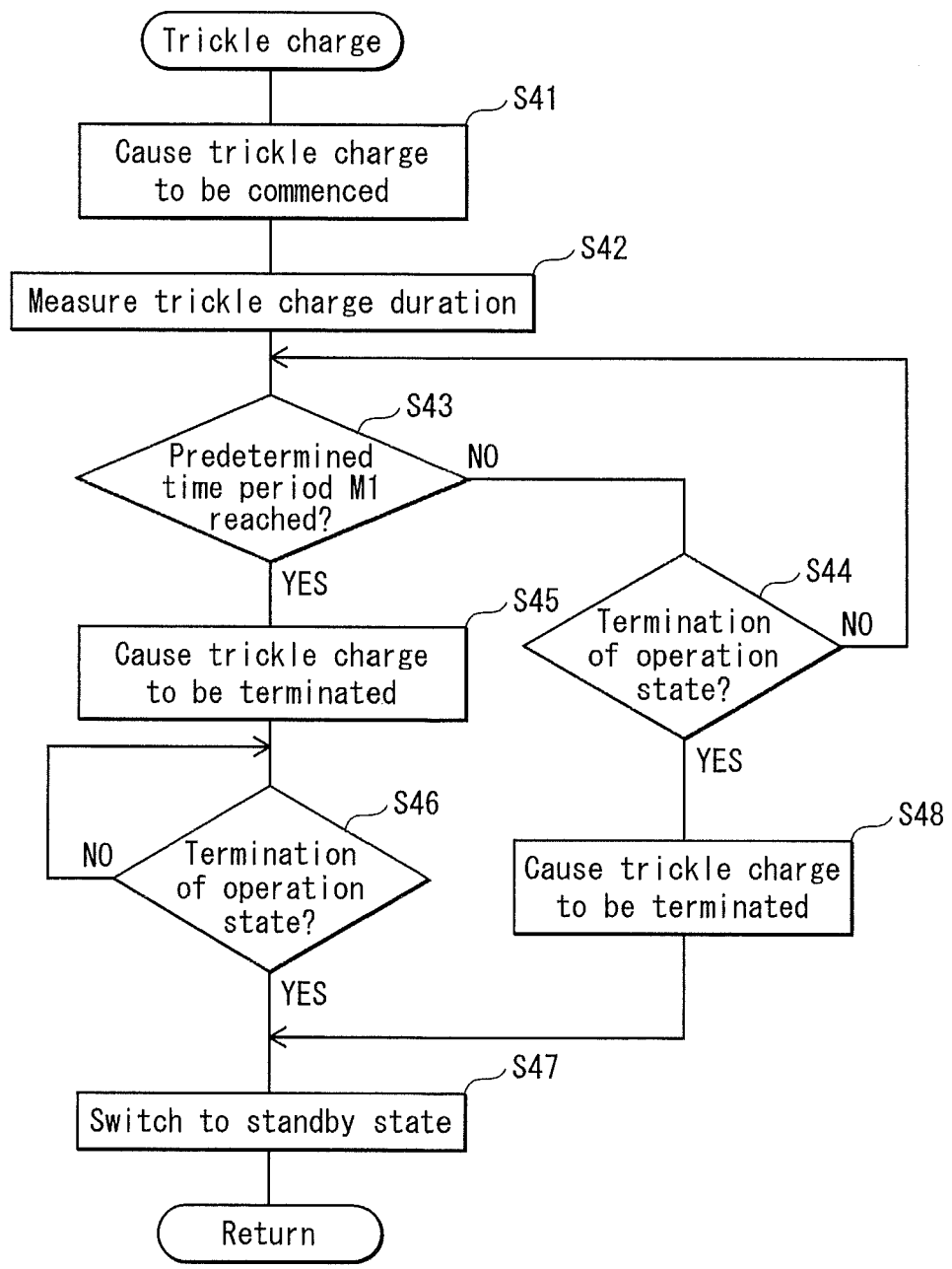
FIG. 9 is a flowchart illustrating a subroutine corresponding to trickle charge.

FIG. 9 is a flowchart illustrating a subroutine corresponding to trickle charge.

As illustrated in FIG. 9, the power supply control unit 15 causes trickle charge of the secondary battery 30 to be commenced (Step S41) (corresponding to time point t4 in FIG. 2).

Figure 10:
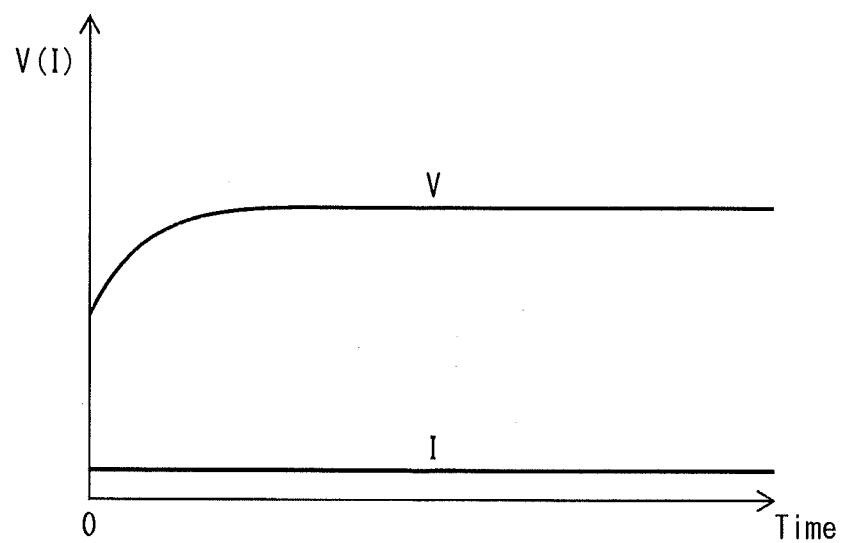
FIG. 10 illustrates an example of a battery voltage waveform and a battery current waveform during trickle charge.

Trickle charge is a method of charging the secondary battery 30 where a minute electric current (corresponding to approximately 1/30 to 1/20 of the electric current in rapid charge) is caused to flow through the secondary battery 30 ceaselessly so as to compensate for self-discharge of the secondary battery 30. When trickle charge is performed with respect to the secondary battery 30, the load exerted on the secondary battery 30 is low compared to when rapid charge is performed, and thus, the life-span of the secondary battery 30 can be extended. FIG. 10 illustrates an example of a battery voltage waveform and a battery current waveform during trickle charge of the secondary battery 30. As can be seen in FIG. 10, a substantially-constant minute electric current is supplied to the secondary battery 30 when trickle charge is performed.

Returning to FIG. 9, the power supply control unit 15 causes a measurement to be made of a trickle charge duration in Step S42. In specific, the measurement of the trickle charge duration is performed by the trickle charge timer 15c.

Subsequently, the power supply control unit 15 determines whether or not the trickle charge duration has reached a predetermined time period M1 (Step S43). The predetermined time period M1 is a time period that is set in advance as the duration of trickle charge required for preventing the secondary battery voltage Vb of the secondary battery 30 from falling below the charge completion value Vt during the operation state.

Even when a measurement is made that the secondary battery voltage Vb has reached the charge completion value Vt, there may be cases where the secondary battery voltage Vb is actually slightly lower than the charge completion value Vt due to measurement errors in the value of the secondary battery voltage Vb measured by the voltage measurement unit 15d.

In view of such cases, when a measurement is made that the secondary battery voltage Vb has reached the charge completion value Vt during the operation state, rapid charge is no longer performed following this point, but however, trickle charge of the secondary battery 30 is performed for the predetermined time period M1 such that, even when the secondary battery voltage Vb is slightly lower than the charge completion value Vt, the secondary battery voltage Vb is caused to rise so as to further approach the charge completion value Vt.

The predetermined time period M1 is set such that, when presuming, for instance, that a duration of the operation state (corresponding to the job execution time) is, in average, around 60 seconds, the predetermined time period M1 is set to around 30 seconds, which corresponds to half the duration of the operation state. The predetermined time period M1 is set to be relatively short since it suffices if compensation is made of the measurement errors in the value of the secondary battery voltage Vb measured by the voltage measurement unit 15d. Further, an appropriate value for the predetermined time period M1 is set in advance according to results of experiments or the like, and is stored in the storage unit 17.

When determining that the trickle charge duration has not reached the predetermined time period M1 ("NO" in Step S43), the power supply control unit 15 determines termination or non-termination of the operation state (Step S44). When determining non-termination of the operation state ("NO" in Step S44), the power supply control unit 15 returns to the processing in Step S43.

When determining that the trickle charge duration has not reached the predetermined time period M1 and determining non-termination of the operation state, the power supply control unit 15 repeatedly executes the processing in Steps S43 and S44 until the power supply control unit 15 determines that the trickle charge duration has reached the predetermined time period M1 or the power supply control unit 15 determines termination of the operation state.

When determining that the trickle charge duration has reached the predetermined time period M1 ("YES" in Step S43), the power supply control unit 15 causes trickle charge to be terminated (Step S45), and further, determines termination or non-termination of the operation state (Step S46). When determining termination of the operation state ("YES" in Step S46), the power supply control unit 15 causes the power supply device 10 to switch to the standby state (Step S47). Following this, processing returns to the subroutine in FIG. 6.

When determining termination of the operation state before the trickle charge duration reaches the predetermined time period M1 ("YES" in Step S44), the power supply control unit 15 causes trickle charge to be terminated (Step S48), and causes the power supply device 10 to switch to the standby state in Step S47. Following this, processing returns to the subroutine in FIG. 6.

In the above, description has been provided that the duration for performing trickle charge is limited to the predetermined time period M1. However, the present embodiment is not limited to this, and trickle charge may be continuously performed until termination of the operation state. In addition, the charge method is not limited to trickle charge, and other charge methods may be applied provided that the amount of electric current applied to the secondary battery 30 is small compared to the charge method executed in rapid charge.

(5-4) Standby State Processing

Figure 11:
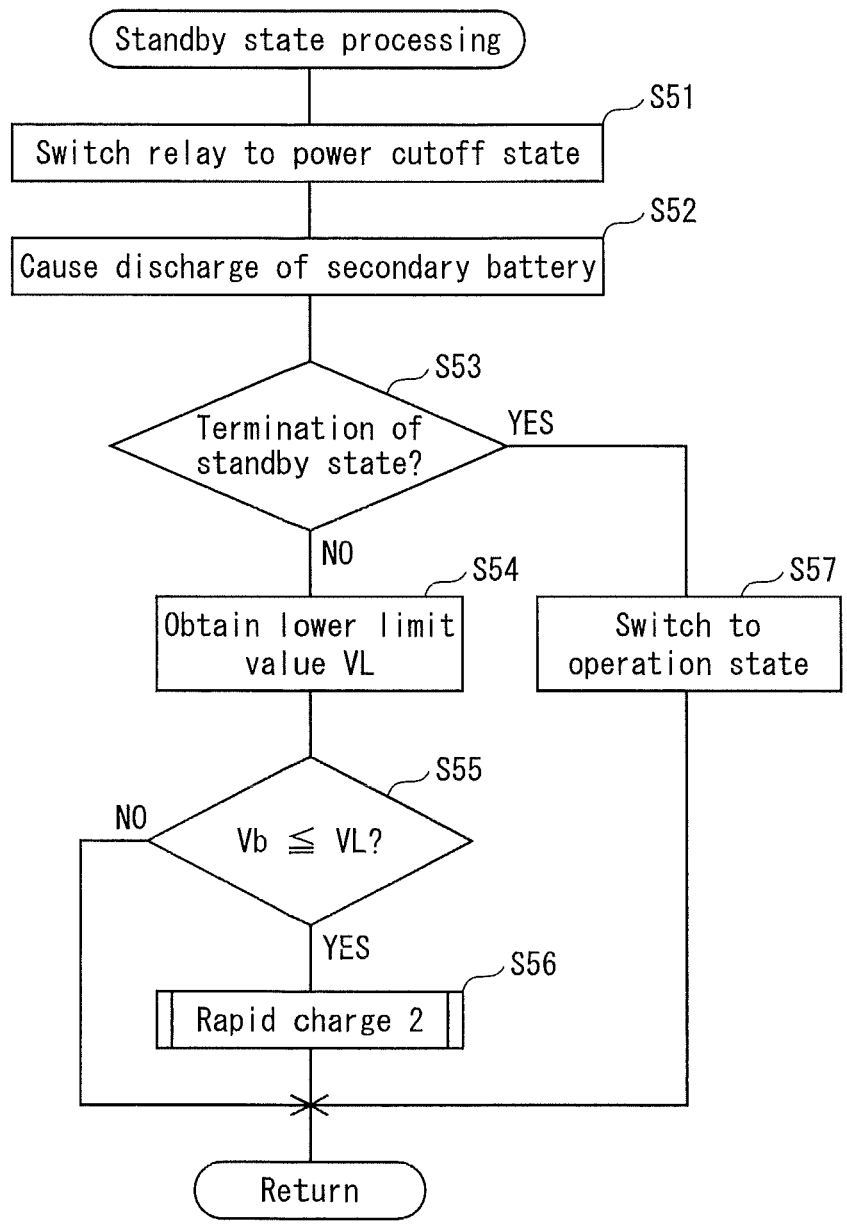
FIG. 11 is a flowchart illustrating a subroutine corresponding to standby state processing.

FIG. 11 is a flowchart illustrating a subroutine corresponding to standby state processing.

As illustrated in FIG. 11, the power supply control unit 15 switches the relay 12 to the power cutoff state (Step S51) and causes power from the secondary battery 30 to be supplied to the I/F 22 (i.e., causes discharge of the secondary battery 30) (Step S52). The discharge of the secondary battery 30 is performed by the power supply control unit 15 issuing an instruction for discharge to the discharge control unit 16.

Subsequently, the power supply control unit 15 determines termination or non-termination of the standby state (Step S53). The power supply control unit 15 determines termination of the standby state when determining that the flag set to the predetermined region has changed from the standby state flag to the operation state flag.

When determining termination of the standby state ("YES" in Step S53), the power supply control unit 15 causes the power supply device 10 to switch to the operation state (Step S57). Following this, processing returns to the subroutine in FIG. 5.

On the other hand, when determining non-termination of the standby state ("NO" in Step S53), the power supply control unit 15 obtains the lower limit value VL (Step S54), and further, determines whether or not the secondary battery voltage Vb is equal to or smaller than the lower limit value VL (Step S55).

When Vb≤VL is not satisfied, or that is, when Vb>VL ("NO" in Step S55), processing returns to the subroutine in FIG. 5 since the power supply control unit 15 determines that the secondary battery voltage Vb has not dropped to the lower limit value VL.

In contrast, when Vb≤VL ("YES" in Step S55), the power supply control unit 15 causes rapid charge 2 to be performed (Step S56) since the secondary battery voltage Vb has dropped to the lower limit value VL as a result of discharge of the secondary battery 30 and since further discharge of the secondary battery 30 would result in a great load being exerted on the secondary battery 30. Following this, processing returns to the subroutine in FIG. 5.

(5-5) Rapid Charge 2

Figure 12:
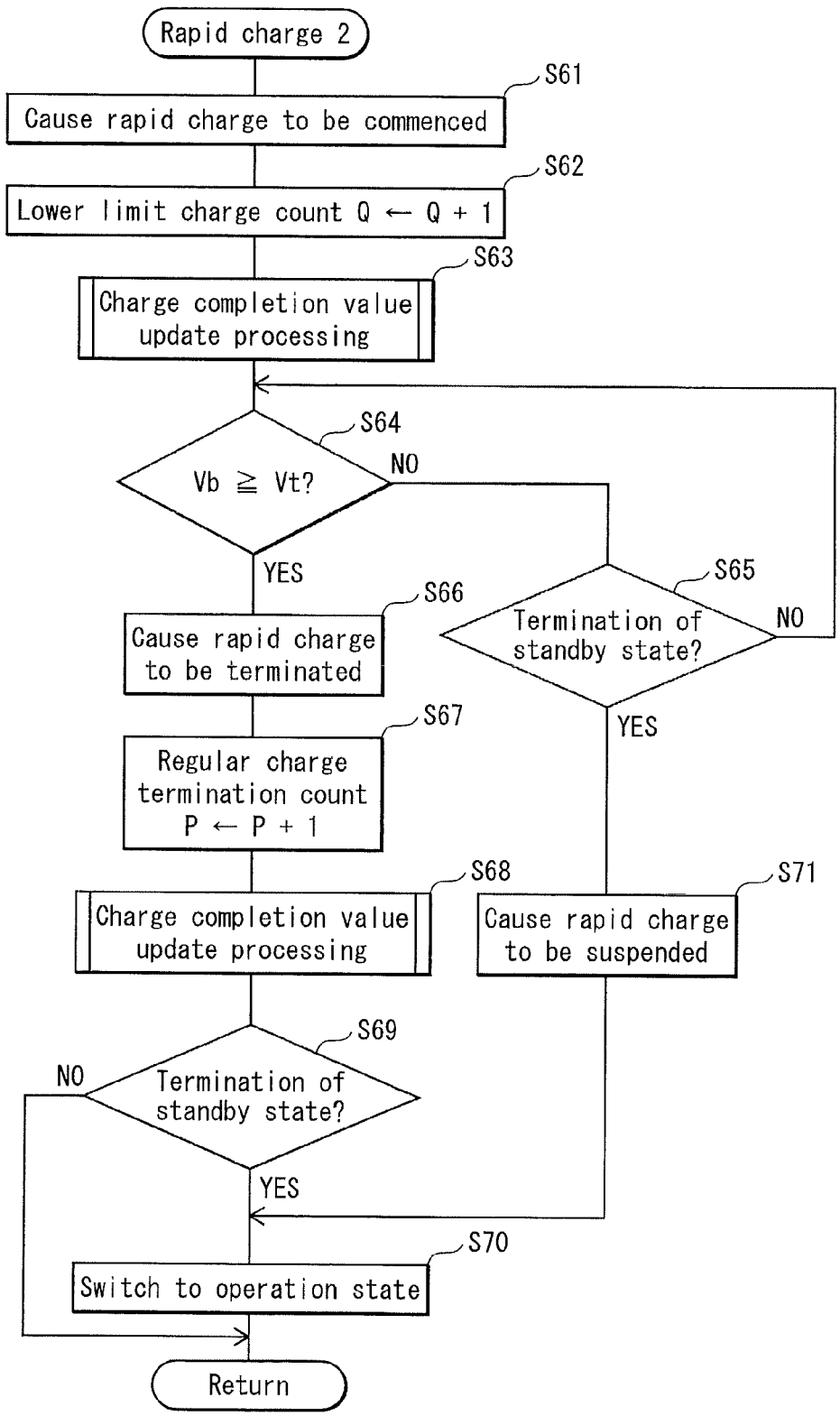
FIG. 12 is a flowchart illustrating a subroutine corresponding to rapid charge 2.

FIG. 12 is a flowchart illustrating a subroutine corresponding to rapid charge 2.

As illustrated in FIG. 12, the power supply control unit 15 causes rapid charge of the secondary battery 30 to be commenced (Step S61), and subsequently, updates the lower limit charge count Q by setting a value obtained by incrementing the present lower limit charge count Q by one as the new lower limit charge count Q (Step S62). The updating of the lower limit charge count Q is performed by the lower limit charge count counter 15a counting up by one count from the present lower limit charge count Q.

Subsequently, the power supply control unit 15 executes charge completion value update processing (Step S63). The charge completion value update processing executed in Step S63 is similar to the charge completion value update processing in rapid charge 1 (Step S26).

In the charge completion value update processing executed in Step S63, since the lower limit charge count Q has been updated in the immediately preceding Step S62, the charge completion value Vt is updated according to the updated lower limit charge count Q and the present regular charge termination count P.

In Step S64, the power supply control unit 15 determines whether or not the secondary battery voltage Vb is equal to or greater than the charge completion value Vt. Note that since rapid charge in FIG. 12 is rapid charge performed during the standby state, a structure where rapid charge is terminated when the secondary battery voltage Vb rises to a predetermined voltage that is lower than the charge completion value Vt may be employed, instead of the above-described structure where rapid charge is performed until the secondary battery voltage Vb reaches the charge completion value Vt.

When Vb≥Vt is not satisfied, or that is, when Vb<Vt ("NO" in Step S64), the power supply control unit 15 determines termination or non-termination of the standby state (Step S65). When determining that non-termination of the standby state ("NO" in Step S65), the power supply control unit 15 returns to the processing in Step S64.

When rapid charge is in progress and the power supply control unit 15 determines that Vb≥Vt is not satisfied and determines non-termination of the standby state, the processing in Steps S64 and S65 is repeatedly performed until the power supply control unit 15 determines that Vb≥Vt is satisfied or the power supply control unit 15 determines termination of the standby state.

When rapid charge is in progress and the power supply control unit 15 determines that Vb≥Vt is satisfied ("YES" in Step S64), the power supply control unit 15 causes rapid charge to be terminated (Step S66), and subsequently updates the regular charge termination count P by setting a value obtained by incrementing the present regular charge termination count P by one as the new regular charge termination count P (Step S67). Note that the updating of the regular charge termination count P performed in Step S67 is similar to the processing performed in Step S25 above.

Subsequently, the power supply control unit 15 executes charge completion value update processing (Step S68), and proceeds to the processing in Step S69. Note that the charge completion value update processing executed in Step S68 is similar to the charge completion value update processing in rapid charge 1 (Step S26). In the charge completion value update processing executed in Step S68, since the regular charge termination count P has been updated in the immediately preceding Step S67, the charge completion value Vt is updated according to the updated regular charge termination count P and the present lower limit charge count Q.

Note that when employing the above-described structure where rapid charge is terminated when the secondary battery voltage Vb rises to the predetermined voltage that is lower than the charge completion value Vt by replacing the charge completion value Vt in Step S64 with the predetermined voltage, the power supply control unit 15 skips (does not execute) the processing in Steps S67 and S68, and proceeds to the processing in Step S69.

In Step S69, the power supply control unit 15 determines whether or not the standby state is to be terminated.

When the power supply control unit 15 determines non-termination of the standby state ("NO" in Step S69), processing returns to the subroutine in FIG. 11, In the above-described case, the secondary battery voltage Vb has already reached the charge completion value Vt once at this point. Due to this, when the standby state processing is executed once again after one iteration of the main routine is completed, a determination is made of Vb>Vt in Step S55 ("NO" in Step S55), and accordingly, the power supply control unit 15 does not cause rapid charge 2 in Step S56 to be performed.

When determining termination of the standby state ("YES" in Step S69), the power supply control unit 15 causes the power supply device 10 to switch to the operation state (Step S70). Following this, processing returns to the subroutine in FIG. 11.

On the other hand, when determining non-termination of the standby state while rapid charge is in progress ("YES" in Step S65), the power supply control unit 15 causes rapid charge of the secondary battery 30 to be suspended (Step S71), and causes the power supply device 10 to switch to the operation state in Step S70. Subsequently, processing returns to the subroutine in FIG. 11.

As description has been provided up to this point, in a structure where rapid charge is performed during the operation state, during which an image forming job is being executed, the charge completion value Vt, which serves as a condition to be satisfied for suspending rapid charge, is set to a value satisfying $(VL+Vs) \leq Vt < VH$. As such, compared to a structure where the secondary battery 30 is charged to the full battery capacity when rapid charge of the secondary battery 30 can be performed taking into consideration the fact that it is highly uncertain as to when and how frequently rapid charge of the secondary battery 30 can be performed, the load exerted on the secondary battery 30 upon charging can be reduced, and as a result, longevity of the secondary battery 30 can be realized by the reduction in life-span of the secondary battery 30 that is brought about by such load being exerted thereon being suppressed.

Further, since control is performed of changing the charge completion value Vt in accordance with the regular charge termination count P, etc., which can serve as an indicator of the level of degradation of the secondary battery 30, stable output of the secondary battery 30 can be realized even when degradation of the secondary battery 30 has progressed over time. As such, stable operation of the I/F 22 during the standby state can be realized.

In the above, the charge limit voltage VH, the lower limit value VL, the charge completion value Vt and the like are defined as values indicating voltage, and further, description has been provided that charge/discharge processing of the secondary battery 30 is performed according to the relationship between levels of voltage indicated by such values. However, the present embodiment is not limited to this, and the charge limit voltage VH, the lower limit value VL, the charge completion value Vt and the like may be defined by using any value, provided that the value serves an indicator of the battery power level of the secondary battery 30 (a power storage status of the secondary battery 30).

The value indicative of the battery power level of the secondary battery 30 may be, for instance, a battery capacity level of the secondary battery 30. When using the battery capacity level of the secondary battery 30 as the value indicating the battery power level of the secondary battery 30, for instance, the full battery capacity of the secondary battery 30 may be set as 100%, and the lower limit value VL, the charge completion value Vt and the like may be defined by values indicating percentage. In such a case, the lower limit value VL may be defined as X %, and the charge completion value Vt may be defined as Y % (Y>X), for instance. Further, a residual battery capacity level of the secondary battery 30 may be calculated by providing a detection unit configured to detect the residual battery capacity level of the secondary battery 30 or by providing a calculation unit configured to calculate the proportion (%) of the battery capacity level of the secondary battery 30 having been charged or discharged according to the current amount applied to the secondary battery 30 upon charge and discharge.

In specific, when presuming that the secondary battery 30 is charged by constant current control, a proportion (%) of the battery capacity level of the secondary battery 30 having been charged can be calculated by determining, in advance by conducting experiments or the like, a rate at which the battery capacity level of the secondary battery 30 increases when the secondary battery 30 is charged for a unit time interval, and further, by multiplying the increase rate and the actual charge duration during which charge of the secondary battery 30 is performed. Further, a determination can be made that the charge completion value Vt has been reached when the residual battery capacity level of the secondary battery 30 reaches Y % of a reference battery capacity level (for instance, X %). Further, when the secondary battery voltage corresponding to the reference battery capacity level is determined, the increase and decrease of the battery capacity level of the secondary battery 30 can be determined by referring to this voltage corresponding to the reference battery capacity level.

In addition, by multiplying the battery capacity level of the secondary battery 30 decreasing when the secondary battery 30 discharges for a unit time interval and the actual discharge duration during which discharge of the secondary battery 30 is performed, a proportion (%) of the battery capacity level of the secondary battery 30 having been discharged can be determined, and further, a determination can be made that the lower limit value VL has been reached when the residual battery capacity level of the secondary battery 30 drops to X % of the reference battery capacity level.

Here, note that the reference voltage of the secondary battery 30 may be set to a voltage value other than the lower limit value VL, and a battery capacity level of the secondary battery 30 corresponding to this voltage value may be used as the reference battery capacity level of the secondary battery 30. Further, the provision of the detection unit for detecting the voltage of the secondary battery 30 is unnecessary when a structure is employed where detection is performed of the residual battery capacity level itself of the secondary battery 30.

Further, it should be noted that, depending upon the type of battery used as the secondary battery 30, the charge/discharge characteristics of the secondary battery 30 may readily change in accordance with a change in the ambient temperature.

Figure 13:
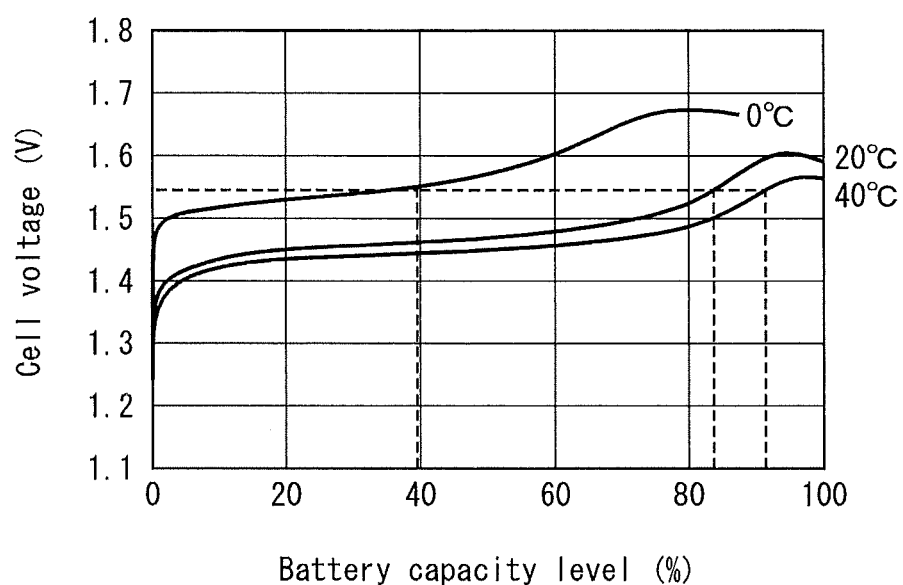
FIG. 13 illustrates an example of changes in charge/discharge characteristics of the secondary battery.

FIG. 13 illustrates an example of changes in charge/discharge characteristics of the secondary battery 30. As can be seen in FIG. 13, the correlation between the residual battery capacity level of the secondary battery 30 and the cell voltage of the secondary battery 30 changes in accordance with the ambient temperature. As such, even when charging of the secondary battery 30 is performed to the same target voltage (for instance, 1.55 V), the battery capacity level of the secondary battery 30 actually charged differs depending upon the ambient temperature.

In view of such a problem, a structure may be employed where a detection unit such as a sensor that detects the temperature in a the periphery of the secondary battery 30 is provided and the charge completion value Vt is corrected in accordance with the detected temperature such that, even when a change is observed in the temperature, the secondary battery 30 can be charged to the same (the target) battery power level.

When employing the above-described structure, the charge completion value Vt increases and decreases with respect to a reference value (a value that can be determined based on the estimated maximum duration Ta of the standby state) corresponding to a reference temperature.

As the method utilized for correcting the charge completion value Vt in accordance with the detected temperature, a method as described in the following may be utilized, for instance. First, a secondary battery voltage corresponding to a target battery capacity level (for instance, 40%) at a reference temperature (for instance, 20° C.) is set as the reference voltage in advance, and further, a voltage change rate indicating the rate of increase/decrease of the secondary battery voltage with respect to the reference voltage when the detected temperature changes from the reference temperature is calculated in advance. Further, when the measured voltage of the secondary battery 30 exceeds the reference voltage due to change in temperature, a voltage calculated by multiplying the voltage change rate to a difference between the ambient temperature and the reference temperature is subtracted from the reference voltage. On the other hand, when the measured voltage of the secondary battery 30 drops below the reference voltage due to change in temperature, a voltage calculated by multiplying the voltage change rate to a difference between the ambient temperature and the reference temperature is added to the reference voltage.

Note that the above-described structure of utilizing the battery capacity level of the secondary battery 30 as the value indicating the battery power level of the secondary battery 30 and the above-described structure of correcting the charge completion value Vt in accordance with ambient temperature may be similarly applied to embodiment 2 of the present invention, description of which is provided in the following.

Embodiment 2

In embodiment 1, description has been provided of a structure where the estimated maximum duration Ta (e.g., 23 hours) of the standby state is determined in advance, and the charge completion value Vt is set according to the estimated maximum duration Ta. The present embodiment differs from embodiment 1 in that actual measurement is performed of the duration of the standby state within a given day, and the charge completion value Vt for a day following the given day is set according to the duration of the standby state within the previous day. Note that, in the description provided in the following, so as to avoid the same description as provided in embodiment 1 from being repeated once again, description is omitted in the following of aspects similar to those in embodiment 1, and further, components that commonly appear in both embodiments 1 and 2 are provided with the same reference signs.

Figure 14:
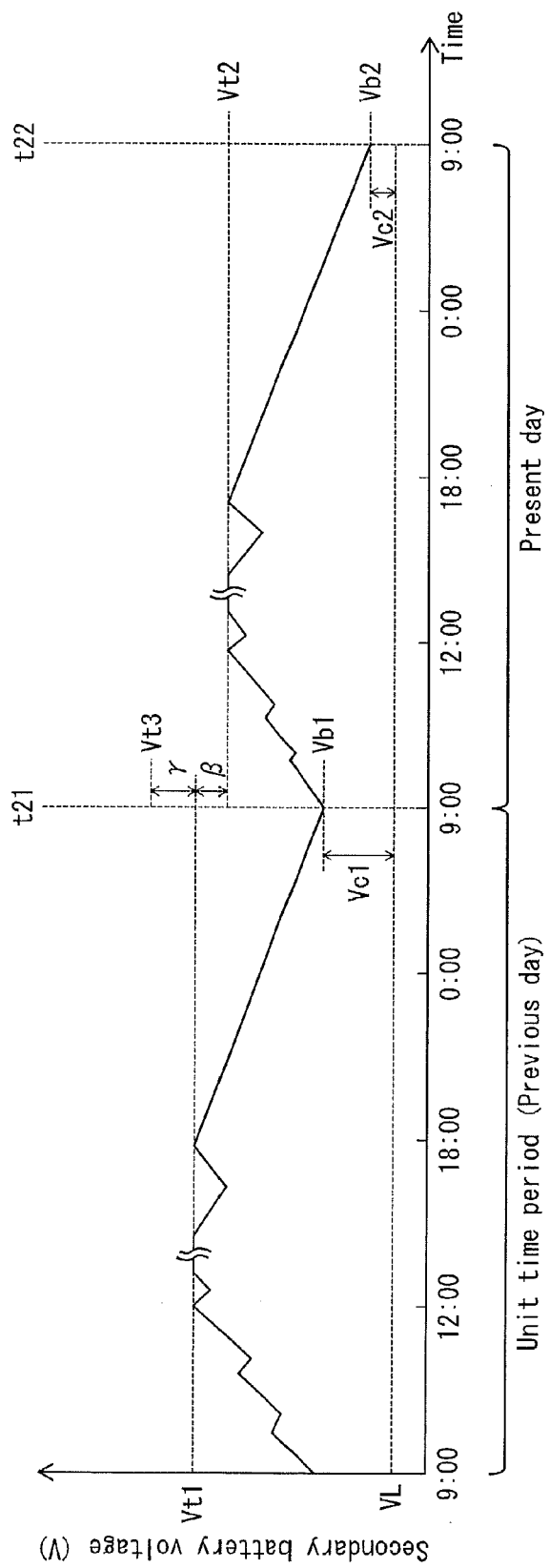
FIG. 14 is a diagram describing charge/discharge processing performed with respect to the secondary battery in embodiment 2.

FIG. 14 is a diagram describing charge/discharge processing performed with respect to the secondary battery 30 in the present embodiment.

In FIG. 14, a given day during which charge/discharge processing is to be performed is referred to as the "present day". Time point t21 in FIG. 14 indicates a time point at which the present day begins (hereinafter referred to as a "business start point"). Note that, FIG. 14 illustrates a case where, at time point t21, a difference Vc1 exists between a secondary battery voltage Vb1 and the lower limit value VL.

The difference Vc1 is a value indicating how close the secondary battery voltage Vb is to the lower limit value VL at the business start point. As such, a smaller value for the difference Vc1 indicates that the secondary battery voltage Vb has dropped to a value closer to the lower limit value VL.

In the above-described structure (system), where charging of the secondary battery 30 is performed during the operation state and discharge of the secondary battery 30 is performed during the operation state, the charge completion value Vt is preferably set to a relatively great value with a margin of a certain level within the predetermined appropriate range so as to ensure that the secondary battery voltage Vb does not fall below the lower limit value VL during the standby state.

However, when the charge completion value Vt of the secondary battery 30 is set to a relatively great value, the secondary battery voltage Vb increases and decreases within a relatively high range of voltage. When the secondary battery voltage Vb increases and decreases within a relatively high range of voltage, the risk is high of the life-span of the secondary battery 30 being unfavorably affected as described above, compared to when the secondary battery voltage Vb increases and decreases within a relatively low range of voltage (a range of voltage relatively close to the lower limit value VL).

In view of such a problem, in the present embodiment, a determination is made each day of a charge completion value Vt for the present day according to the total duration of the standby state within the previous day (information on charge and discharge of the secondary battery) as an operation history indicating actual usage during the previous day. By setting the charge completion value Vt for the present day in such a manner, the voltage of the secondary battery 30 is caused to increase and decrease within as low a range of voltage as possible, and accordingly, advantageous effects are realized concerning the life-span of the secondary battery 30.

In FIG. 14, it can be seen that the charge completion value Vt for the present day, which is denoted by Vt2, is lower by β than the charge completion value Vt for the previous day, which is denoted by Vt1. As such, the range of voltage within which the secondary battery 30 operates during the present day, as a whole, is closer to the lower limit value VL compared to the range of voltage within which the secondary battery 30 has operated during the previous day, and further, a difference Vc2 between the secondary battery voltage Vb2 and the lower limit value VL at the time point t22 where the present day ends is smaller than the difference Vc1 at time point t21.

In the following, description is provided on a method for performing charge completion value changing processing of changing the charge completion value Vt of a present day in accordance with an operation history during a previous day, with reference to FIGS. 15 through 17.

FIG. 15 is a flowchart illustrating processing incorporating the charge completion value changing processing. The processing illustrated in FIG. 15 is executed by the power supply control unit 15. Here, note that the flowchart illustrated in FIG. 15 is obtained by rewriting the flowchart illustrated in FIG. 5 such that the charge completion value changing processing (Step S90) is executed before Step S1 in FIG. 5.

Further, since the changing of the charge completion value Vt is performed in the charge completion value changing processing (Step S90) in embodiment 2, the charge completion value update processing (Steps S26, S63, and S68) in embodiment 1 is not executed.

Figure 16:
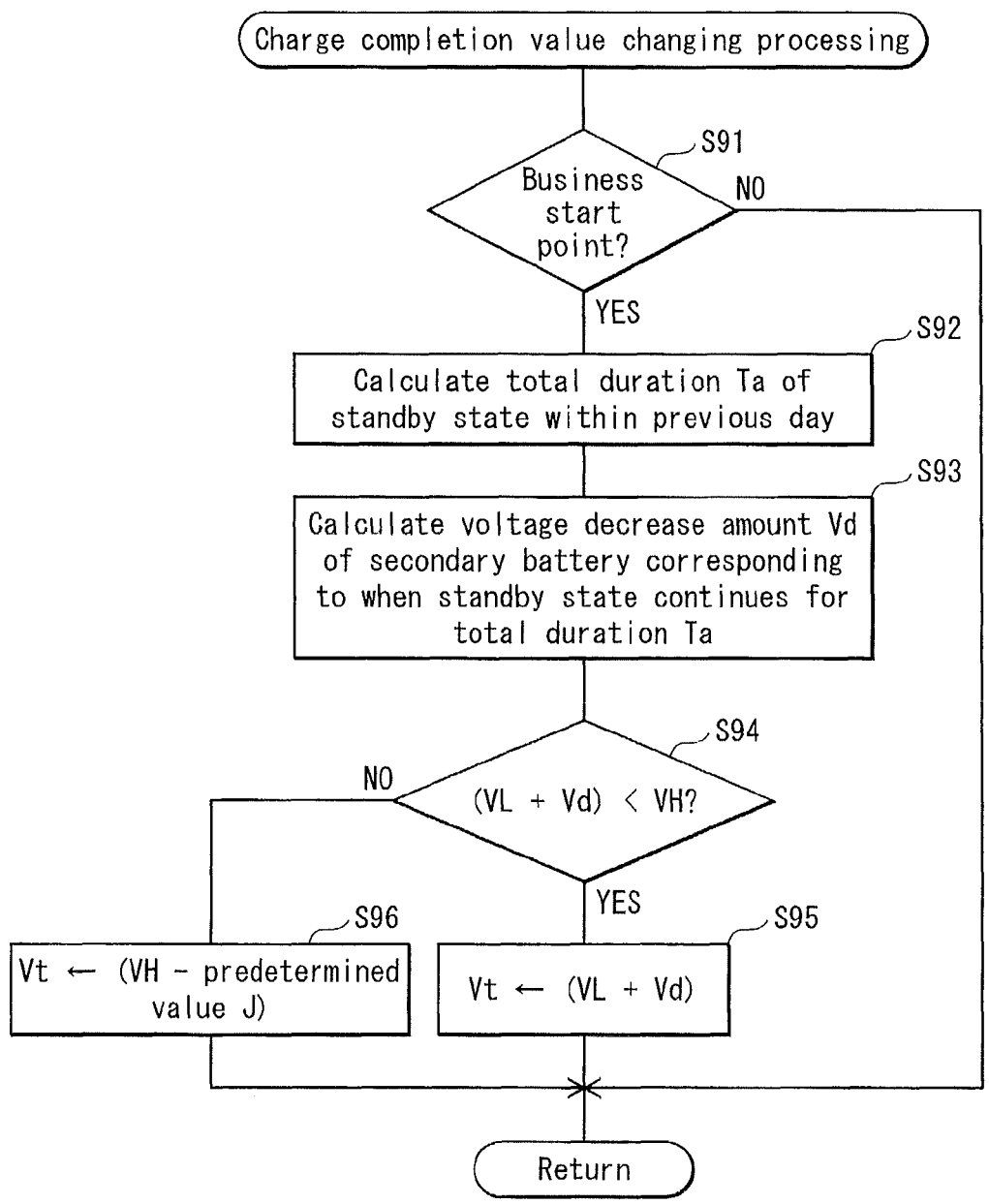
FIG. 16 is a flowchart illustrating a subroutine corresponding to the charge completion value changing processing.

FIG. 16 is a flowchart illustrating a subroutine corresponding to the charge completion voltage changing processing. As illustrated in FIG. 16, the power supply control unit 15 first determines whether or not the present time point corresponds to the business start point (Step S91). When the power supply control unit 15 determines that the present time point does not correspond to the business start point ("NO" in Step S91), processing returns to the subroutine in FIG. 15. That is, in this case, the changing of the charge completion value Vt is not performed.

On the other hand, when determining that the present time point corresponds to the business start point ("YES" in Step S91), the power supply control unit 15 performs the changing of the charge completion value Vt (Steps S92 through S96).

More specifically, the power supply control unit 15 first calculates a total duration Ta of the standby state within the previous day (Step S92).

The calculation of the total duration Ta is performed by referring to an operation history information table provided to the storage unit 17.

FIG. 17 illustrates an example of a configuration of an operation history information table 101.

As illustrated in FIG. 17, the operation history information table 101 is a table in which, writing of a start time point of the standby state and an end time point of the standby state is performed every time the power supply device 10 switches from the operation state to the standby state (every time the secondary battery 30 is switched to a state of discharge) within a unit time period (one day). In specific, FIG. 17 illustrates an example of the operation history information table 101 that indicates that the power supply device 10 was in the standby state from 9:10 A.M. to 9:15 A.M., from 9:20 A.M. to 9:30 A.M., and the like during the previous day. It can also be said that, the power supply device 10 was in the operation state during time periods other than the time periods indicated in the operation history information table 101.

It is possible to determine the duration of each time period corresponding to the standby state from the start time point of the time period corresponding to the standby state and the end time point of the time period corresponding to the standby state. Further, by adding up the duration of the time periods corresponding to the standby state within the previous day, the total duration Ta of the standby state within the previous day can be calculated.

Returning to FIG. 16, the power supply control unit 15 calculates a voltage decrease amount Vd in Step S93. The voltage decrease amount Vd indicates a decrease in the voltage amount of the secondary battery 30 that would take place when the standby state were to continue for the total duration Ta calculated as described above. The voltage decrease amount Vd corresponds to the minimum system-required capacity level Vs described above, and further, the total duration Ta is used as the estimated maximum duration of the standby state during the present day.

More specifically, the voltage decrease amount Vd is calculated by multiplying the total duration Ta and a voltage decrease amount per unit time length during the standby state. Here, the voltage decrease amount per unit time length indicates a decrease in voltage amount of the secondary battery 30 taking place due to discharge performed during the standby state. The voltage decrease amount per unit time length may be determined in advance by conducting experiments or the like, or also, may be determined by performing actual measurement of the secondary battery voltage Vb of the secondary battery 30 during the standby state within a previous day and thereby detecting the actual decrease in voltage amount taking place within a unit time length.

As description has been provided above, the voltage decrease amount Vd indicates the voltage decrease amount of the secondary battery 30 when presuming that the standby state were to continue for the total duration Ta (i.e., the estimated maximum duration of the standby state within the present day). As such, the secondary battery voltage Vb of the secondary battery 30 would not drop below the lower limit value VL even when the standby state were to continue for the same total duration Ta as the previous day by setting a value calculated by adding the voltage decrease amount Vd to the lower limit value VL as the charge completion value Vt and by performing charge of the secondary battery 30 such that the secondary battery voltage Vb rises to the charge completion value Vt so calculated.

As such, the power supply control unit 15 determines whether or not a value calculated by adding the voltage decrease amount Vd to the lower limit value VL is smaller than the charge limit voltage VH in Step S94. When determining that the value calculated by adding the voltage decrease amount Vd to the lower limit value VL is smaller than the charge limit voltage VH ("YES" in Step S94), the power supply control unit 15 updates the charge completion value Vt by setting the value calculated by adding the voltage decrease amount Vd to the lower limit value VL as the new charge completion value Vt (Step S95). Following this, processing returns to the subroutine illustrated in FIG. 15.

When determining that the value calculated by adding the voltage decrease amount Vd to the lower limit value VL is not smaller than the charge limit voltage VH ("NO" in Step S94), the power supply control unit 15 updates the charge completion value Vt by setting a value calculated by subtracting a predetermined value J from the charge limit voltage VH as the new charge completion value Vt (Step S96). Following this, processing returns to the subroutine illustrated in FIG. 15.

The predetermined value J is a relatively small value and is set in advance. The predetermined value J is, for instance, 0.1 V. By the power supply control unit 15 updating the charge completion value Vt in the above-described manner, the charge completion value Vt can be set to a value that is smaller than the charge limit voltage VH but close to the charge limit voltage VH. Accordingly, the charge completion value Vt can be changed so as to be within a range between the lower limit value VL and the charge limit voltage VH.

Further, since it can be expected that the total duration Ta fluctuates to a certain extent depending upon the day, correction may be performed of setting the voltage decrease amount Vd to a slightly greater value than described above (while ensuring that the secondary battery voltage Vb does not reach the charge limit voltage VH). When performing correction of the voltage decrease amount Vd in such a manner, the voltage decrease amount Vd can be provided with a margin of a certain level, which prevents the secondary battery voltage Vb of the secondary battery 30 from dropping below the lower limit value VL before the business start point as a result of the total duration Ta fluctuating between days.

In addition, a smaller value is set to the charge completion value Vt for smaller values of the voltage decrease amount Vd. Further, a smaller value is set to the voltage decrease amount Vd for smaller values of the total duration Ta of the standby state within the previous day. In other words, the voltage decrease amount Vd decreases as the total duration of the operation state within the previous day increases.

Accordingly, in FIG. 14, when the total duration of the operation state within the previous day is relatively long, the value β increases proportionally, and the range of voltage within which the secondary battery voltage Vb increases and decrease during the present day further approaches the lower limit value VL. As such, when the image forming apparatus is installed at an office or the like where the power supply device 10 switches to the operation state at a relatively high frequency, advantageous effects are realized concerning the life-span of the secondary battery 30.

When the charge completion value Vt is updated at the business start point (t21), the obtaining of the charge completion value Vt during the operation state processing executed following this point (Step S14) is performed by reading the updated charge completion value Vt.

Further, at the business start point (t22) of the following day, the charge completion value changing processing (Step S90) is performed once again, and the charge completion value Vt is updated to the charge completion value Vt for the following day. The updating of the charge completion value Vt is repeatedly executed for each day. When, as a result, the fluctuation of the charge completion values Vt between days becomes smaller and the charge completion value Vt indicates stability, the range of voltage within which the secondary battery voltage Vb increases and decreases also approaches the lower limit value VL, or that is, the range of voltage within which the secondary battery voltage Vb increases and decreases settles at a relatively low range of voltage. As such, an extension of the life-span of the secondary battery 30 is realized.

Note that in the present embodiment, either one or both of (i) changing the charge current value for charging the secondary battery 30 and (ii) changing the time limit for charging of the secondary battery 30 may be performed when the charge completion value Vt is updated (changed), similar as in embodiment 1.

In addition, although description has been provided in the above presuming a case where not much change is observed between days of the ratio between the duration of the operation state and the duration of the standby state, there may be cases where the power supply device 10 rarely switches to the operation state within a given day which may be, for instance, a non-business day within a week or the like. When such a day (a non-business day) is determined in advance, a structure may be employed where, in Step S95 of the charge completion value changing processing performed during the day before the non-business day (a day that is not a non-business day), updating of the charge completion value Vt is performed by setting a value obtained by adding the voltage decrease amount Vd and a predetermined value Z to the lower limit value VL as the updated charge completion value Vt.

The predetermined value Z is a value for correcting and setting the charge completion value Vt to a higher value than in normal cases such that the secondary battery voltage Vb does not drop below the lower limit value VL even when the secondary battery 30 is discharged for substantially 24 hours as a result of the standby state continuing for a substantially 24-hour period corresponding to a non-business day.

For instance, when presuming that the present day (a day that is not a non-business day) in FIG. 14 corresponds to a day before a non-business day and that the following non-business day starts from time point t22, the predetermined value Z is utilized in the charge completion value changing processing that is executed at time point t21. As a result, the charge completion value Vt for the present day increases by γ from Vt1 to Vt3 while still being smaller than the charge limit voltage VH.

As such, during the present day, the voltage of the secondary battery 30 rises to Vt3 at maximum by charging of the secondary battery 30 being performed. Accordingly, the risk is suppressed of the secondary battery voltage Vb dropping below the lower limit value VL during the following non-business day compared to a case where the predetermined value Z is not utilized in the updating of the charge completion value changing processing and hence, the voltage of the secondary battery 30 rises to Vt2 at maximum. The predetermined value Z for the correction of the charge completion value Vt is an appropriate value set in advance.

Note that, in the above-described case, the predetermined value Z is no longer utilized when the non-business day ends, and from the day following the non-business day, the normal charge completion value changing processing as described above is executed. An appropriate value is to be set as the predetermined value Z by conducting experiments or the like in advance.

In the above, description is provided on an example of a structure where the charge completion value Vt for a present day during which charge/discharge processing of the secondary battery 30 is to be performed (a first time period) is calculated by setting, as the estimated maximum duration of the standby state within the present day, the total duration Ta of the standby state within a day before the present day (a second time period), and by using the total duration Ta thus set. However, the present embodiment is not limited to calculating the charge completion value Vt for the present day according to the total duration Ta within the day before the present day. That is, the present embodiment may also be applied to calculate the charge completion value Vt for the present day according to the total duration Ta for the same day of the week one week before the present day.

In specific, a method may be applied of replacing "the present day" in FIG. 14 with "Monday of the present week" and replacing "the previous day" (the day before the present day) in FIG. 14 with "Monday of the week before", and calculating the charge completion value Vt for the Monday of the present week by utilizing the total duration Ta of the standby state during the Monday of the week before. The same similarly applies to the other days of the week.

In an office or the like, there are cases where the same regular meetings or events are held on the same day every week, and in such cases, there is a high possibility that the time periods within a day during which the power supply device 10 in the operation state and the time periods within a day during which the power supply device 10 is in the standby state and the like are similar on the same day of the week every week. When the total duration Ta for a given day of the present week and the total duration Ta for the given day of the week before indicate a certain level of similarity, it is likely that the charge completion value Vt for the days also indicate similarity. In such a case, the range of voltage within which the secondary battery voltage Vb increases and decreases as a result of charge/discharge settles at a range of voltage further closer to the lower limit value VL, and as a result, advantageous effects are realized with concerning the life-span of the secondary battery 30. The determination of the day of the week may be performed, for instance, by using a timer (undepicted) having a calendar function.

In addition, description is provided in the above on an example of structure where the total duration Ta of the standby state within a unit time period in the past is obtained as information on the charge/discharge of the secondary battery 30. However, the present embodiment is not limited to this.

For instance, the information on the charge/discharge of the secondary battery 30 may be a value indicating a discharge amount of the secondary battery 30 during the standby state. This is since, when the discharge amount of the secondary battery 30 within a unit time period is substantially fixed, the total discharge amount of the secondary battery 30 may be considered as indicating the duration of the standby state.

In such a case, the charge completion value Vt for a present day can be set by (i) associating the discharge amount of the secondary battery 30 with the voltage decrease amount of the secondary battery 30 brought about by the discharge, (ii) calculating the discharge amount of the secondary battery 30 during the standby state within a unit time period in the past (for instance, the day before the present day or a same day of the week one week before the present day), (iii) calculating the total discharge amount during the unit time period in the past as the total discharge amount of the secondary battery 30 within the estimated maximum duration of the standby state during the present day, and (iv) calculating the voltage decrease amount of the secondary battery 30 when the secondary battery 30 discharges power corresponding to the total discharge amount as the voltage decrease amount Vd (corresponding to the minimum system-required capacity level Vs).

In addition, the present invention is not limited to an image forming apparatus, and may be a method for controlling charge/discharge of a secondary battery in an electronic apparatus such as an image forming apparatus. Further, the present invention may be a program that enables a computer to execute the method. The program pertaining to the present invention may be recorded on various types of computer-readable recording media, such as a magnetic tape, a magnetic disc such as a flexible disc, an optical disc such as a DVD, a CD-ROM, a CD-R, an MO, and a PD, and a flash memory type recording medium. The program may be produced and transferred in the form of the aforementioned recording media or the program may be transmitted and supplied, in the form of the program itself, via various types of wired and wireless networks including the internet, a broadcast, an electric communication circuit, satellite communication, etc.

Modifications

In the above, the present invention has been described based on embodiments thereof. However, as a matter of course, the present invention is not limited to the above embodiments, and modifications such as presented in the following can be performed without departing from the spirit and the scope of the present invention.

(1) In embodiment 1, description has been provided on an example where the regular charge termination count P, the lower limit charge count Q or the like is used to determine whether or not to perform the control of changing the charge completion value Vt. However, the present invention is not limited to this. For instance, a period of use of the secondary battery 30 may be used to determine whether or not to perform the control of changing the charge completion value Vt. The following provides reasons as to why the period of use of the secondary battery 30 may be used to determine whether or not to perform the control of changing the charge completion value Vt.

As the period for which the secondary battery 30 is used extends, degradation of the secondary battery 30 progresses. When degradation of the secondary battery 30 progresses over time, there are cases where, even when the secondary battery 30 is charged such that the voltage thereof rises to the same level of voltage as in charging a non-degraded secondary battery 30, the battery capacity level to which the secondary battery 30 is charged is lower than the battery capacity level to which a non-degraded secondary battery 30 is charged. In such cases, the output from the secondary battery 30 decreases compared to a non-degraded secondary battery 30.

In order to stabilize the output from the secondary battery 30, the battery capacity level to which the secondary battery 30 is charged is to be maintained at the same level as that of a non-degraded secondary battery 30. When attempting to maintain the battery capacity level to which the secondary battery 30 is charged at the same level as that of a non-degraded secondary, there are cases where the battery capacity level to which the secondary battery 30 is charged can be increased by setting the charge completion value Vt to a higher value so as to compensate for the degradation having taken place.

By determining the correlation between the period of use of the secondary battery 30 and the value to which the charge completion value Vt is to be raised so as to compensate for the degradation progressing during the period in advance by conducting experiments or the like, and by actually raising the charge completion value Vt while ensuring that the charge completion value Vt is smaller than the charge limit voltage VH in accordance with the period of use of the secondary battery 30, the battery capacity level to which the secondary battery 30 is charged can be maintained at the same level as that of a non-degraded secondary battery 30 over a long period of time, and the power output from the secondary battery 30 can be stabilized.

Note that the period of use of the secondary battery 30 can be measured by using an undepicted timer or the like, which, in this case, operates on power supplied from the secondary battery 30 during the standby state. In addition, the present invention is not limited to this, and for instance, a structure may be employed where, instead of utilizing a timer, the period of use of the secondary battery 30 is specified according to date/time information obtained from an external source. The external source, from which the date/time information is to be obtained in such a structure, includes input made by a user and input made from a terminal device connected via a network.

In addition, since the regular charge termination count P, the lower limit charge count Q, and the like, which indicate the number of times charging of the secondary battery 30 has been performed, can be considered as values indicating the period of use of the secondary battery 30, the determination of the period of use of the secondary battery 30 may be performed by utilizing the regular charge termination count P and the like without using a timer.

Further, as the method to be utilized in the control of raising the charge completion value Vt in accordance with the period of use of the secondary battery 30, for instance, a method of increasing the charge completion value Vt by a predetermined value step by step every time a unit time period, such as several days, a week, and a month, elapses may be utilized, or a method of gradually increasing the charge completion value Vt for every day elapsing may be utilized. In any case, a method that is appropriate for the secondary battery 30 is to be utilized.

(2) In the embodiments, description has been provided on an example of a structure where the I/F 22 is a reception unit that receives an execution instruction for executing an image forming job. However, the present invention is not limited to this, and the reception unit may be replaced, for instance, with an operation unit such as an operation panel that receives input of an execution instruction from a user performing user operations.

In addition, description has been provided in the embodiments that rapid charge of the secondary battery 30 is performed when the power supply device 10 switches from the standby state to the operation state as a result of an execution instruction being received. However, the present invention is not limited to rapid charge of the secondary battery 30 being commenced exactly at the point where the power supply device 10 switches from the standby state to the operation state, and rapid charge of the secondary battery 30 may be performed at any point during the operation state.

For instance, when one image forming job involves performing image forming with respect to a large number of sheets, the job execution time for executing such an image forming job is relatively long, and accordingly, the operation state continues for a relatively long period of time. As such, when the image forming apparatus is installed at an environment where such image forming jobs are executed frequently, charging of the secondary battery 30 may be commenced following a short amount of time after the commencement of the image forming job (after the power supply device 10 switches to the operation state) since in such cases, there are many opportunities for charging the secondary battery 30. Further, in such a case, trickle charge may be performed during the operation state until rapid charge of the secondary battery 30 is commenced.

(3) In the embodiments, description has been provided that the unit time period (a unit time length) corresponds to one day. However, the present invention is not limited to this, and the unit time period may correspond to a period of half a day, a several hours, a few days, etc.

In addition, although description has been provided above on a structure where the secondary battery 30 is charged by using power from a commercial power source, the present invention is not limited to this. The external power source, which supplies power for charging the secondary battery 30, may include, for instance, at least one of a commercial power source, a solar cell battery, or a thermoelectric conversion element that converts thermal energy such as exhaust heat into electric power.

(4) In the embodiments, description has been provided on a structure where supply and cutoff of electric current to the AC/DC power supply 13 is performed by the relay 12, which is a latching relay. However, the present invention is not limited to this, and relays other than a latching relay or mechanical switching elements may also be used. In addition, a relay and the like need not be provided if it is possible to cut off the supply of power from the commercial power source to the power source control unit, the main body and the like during the standby state.

(5) In the embodiments, description has been provided on an image forming apparatus that executes image forming jobs, which is one example of an electronic apparatus. However, the present invention is not limited to this. The present invention is applicable to electronic apparatuses in general, particularly an electronic apparatus provided with a processing unit and a reception unit that operates on power supplied from a secondary battery, in which, when the reception unit receives a request for processing to be executed by the processing unit during the standby state, the processing unit commences operation and executes the processing requested. One example of such an electronic apparatus is a television provided with a reception unit that receives an "on" signal as a processing request via wireless transmission from an external remote controller while the television is in the sleep state (i.e., the standby state), in which, when the reception unit receives the processing request, components such as a tuner and a display provided to the television turns on (switches to the operation state), and information such as a program is displayed on a screen.

In addition, the present invention may be implemented as any combination of the embodiments and modifications described above.

Conclusion

The above-described embodiments and modifications of the present invention merely indicate one aspect of the present invention that is useful for solving the problems presented in the description of the related art. In conclusion, the present invention is to be construed as including the following aspects.

One aspect of the present invention is an electronic apparatus comprising: a main body that includes a reception unit and a processing unit, the reception unit receiving a processing request and the processing unit executing processing corresponding to the processing request; and a power supply device that is connected with an external power source and a secondary battery and that includes: a state switching unit that causes the power supply device to switch between a standby state for supplying power from the secondary battery to the reception unit without supplying power from the external power source to the main body and an operation state for supplying power from the external power source to the main body, the state switching unit causing the power supply device to switch between the standby state and the operation state such that, when a processing request is received by the reception unit while in the standby state, the state switching unit causes the power supply device to switch to the operation state, and subsequently, when execution of processing corresponding to the processing request is completed by the processing unit, the state switching unit causes the power supply device to return to the standby state; a charge unit that charges the secondary battery with power from the external power source; and a control unit that controls the charge unit such that, the charge unit is caused to commence charging of the secondary battery during the operation state, and the charge unit is caused to terminate charging of the secondary battery (i) when a value indicative of a present battery power level of the secondary battery reaches a threshold value denoted by Vt and (ii) when the power supply device returns to the standby state before the indicative value reaches Vt, wherein Vt satisfies (VL+Vs)≤Vt<VH, where VL denotes a discharge lower limit of a battery power level of the secondary battery, Vs denotes a decrease in the battery power level of the secondary battery occurring when power from the secondary battery is supplied to the reception unit for an estimated maximum duration of the standby state within a time period having a unit time length, and VH denotes a charge upper limit of the battery power level of the secondary battery.

In the electronic apparatus, the control unit may change Vt in accordance with information on charge and discharge of the secondary battery.

In the electronic apparatus, the information on charge and discharge of the secondary battery may be a value indicating the number of times that the secondary battery has been charged, and the control unit may set a higher value to Vt for higher values of the value indicating the number of times that the secondary battery has been charged.

In the electronic apparatus, the control unit may cause the charge unit to charge the secondary battery when the indicative value drops to VL due to power from the secondary battery being supplied to the reception unit during the standby state, and the control unit may set a higher value to Vt when one of conditions (i) through (iv) is satisfied, the conditions (i) through (iv) being: (i) when a greater one of P and Q reaches a first predetermined value; (ii) when a smaller one of P and Q reaches a second predetermined value; (iii) when an average value calculated by dividing a sum of P and Q by two reaches a third predetermined value; and (iv) when the sum of P and Q reaches a fourth predetermined value, where P denotes the number of times charging of the secondary battery has been completed by the indicative value rising to Vt, and Q denotes the number of times charging of the secondary battery has been commenced by the indicative value dropping to VL during the standby state.

In the electronic apparatus, the information may indicate a total duration of the standby state within a time period that has the unit time length, and the control unit may change Vt in accordance with Vs that is calculated by setting, as the estimated maximum duration of the standby state within a first time period that has the unit time length and during which charge and discharge of the secondary battery is to be performed, a total duration of the standby state within a second time period in the past indicated by the information.

In the electronic apparatus, the unit time length may be twenty-four hours, and when the first time period corresponds to a given day, the second time period may correspond to a day before the given day or to the same day of a week one week before the given day.

In the electronic apparatus, when a day following the given day corresponding to the first time period is not a business day and the day corresponding to the second time period is a business day, the control unit may set, as Vt for the given day that corresponds to the first time period and during which charge and discharge of the secondary battery is to be performed, a value higher by a predetermined value Z than Vt for the given day that is calculated by setting, as the estimated maximum duration of the standby state within the given day, the total duration of the standby state within the day corresponding to the second time period.

In the electronic apparatus, the information may indicate a total discharge amount of the secondary battery during the standby state within a time period that has the unit time length, the control unit may set, as a total discharge amount of the secondary battery during the estimated maximum duration of the standby state within a first time period that has the unit time length and during which charge and discharge of the secondary battery is to be performed, a total discharge amount of the secondary battery during the standby state within a second time period in the past indicated by the information, and the control unit may change Vt in accordance with Vs that is calculated as a decrease in the indicative value caused by the secondary battery discharging the total discharge amount during the estimated maximum duration.

In the electronic apparatus, the unit time length may be twenty-four hours, and when the first time period corresponds to a given day, the second time period may correspond to a day before the given day or to the same day of a week one week before the given day.

In the electronic apparatus, when a day following the given day corresponding to the first time period is not a business day and the day corresponding to the second time period is a business day, the control unit may set, as Vt for the given day that corresponds to the first time period and during which charge and discharge of the secondary battery is to be performed, a value higher by a predetermined value Z than Vt for the given day that is calculated by setting, as the estimated maximum duration of the standby state within the given day, the total duration of the standby state within the day corresponding to the second time period.

In the electronic apparatus, the information on charge and discharge of the secondary battery may be a value indicating a length of a period for which the secondary battery has been used, and the control unit may set a higher value to Vt for higher values of the value indicating the length of the period for which the secondary battery has been used.

In the electronic apparatus, the control unit may change Vt at the beginning of the time period having the unit time length.

In the electronic apparatus, when changing Vt, the control unit may also change either one or both of a charge current value for charging the secondary battery and a time limit for charging the secondary battery.

In the electronic apparatus, the control unit may obtain a temperature in a periphery of the secondary battery and may perform correction of Vt in accordance with the temperature obtained such that $(VL+Vs) \leq Vt < VH$ is satisfied.

In the electronic apparatus, when the indicative value reaches Vt at a given time point during the operation state as a result of charging, the control unit may switch a charge method for charging the secondary battery from a first method that has been utilized up to the given time point to a second method according to which smaller electric current is applied to the secondary battery compared to the first method, and the control unit may cause the charge unit to charge the secondary battery according to the second method for a predetermined time period following the given time point or until the power supply device returns to the standby state from the operation state.

In the electronic apparatus, the control unit may cause the charge unit to commence charging of the secondary battery when the power supply device switches from the standby state to the operation state.

In the electronic apparatus, the indicative value may be a present voltage of the secondary battery.

In the electronic apparatus, the external power source may include, as a power source from which power is supplied to the secondary battery for charging the secondary battery, at least one of a commercial power supply, a solar cell battery, or a thermoelectric conversion element.

Another aspect of the present invention is an image forming apparatus comprising: a main body that includes a reception unit and an image forming unit, the reception unit receiving an image forming request and the image forming unit executing image forming corresponding to the image forming request; and a power supply device that is connected with an external power source and a secondary battery and that includes: a state switching unit that causes the power supply device to switch between a standby state for supplying power from the secondary battery to the reception unit without supplying power from the external power source to the main body and an operation state for supplying power from the external power source to the main body, the state switching unit causing the power supply device to switch between the standby state and the operation state such that, when an image forming request is received by the reception unit while in the standby state, the state switching unit causes the power supply device to switch to the operation state, and subsequently, when execution of image forming corresponding to the image forming request is completed by the image forming unit, the state switching unit causes the power supply device to return to the standby state; a charge unit that charges the secondary battery with power from the external power source; and a control unit that controls the charge unit such that, the charge unit is caused to commence charging of the secondary battery during the operation state, and the charge unit is caused to terminate charging of the secondary battery (i) when a value indicative of a present battery power level of the secondary battery reaches a threshold value denoted by Vt and (ii) when the power supply device returns to the standby state before the indicative value reaches Vt, wherein Vt satisfies $(VL+Vs) \leq Vt < VH$, where VL denotes a discharge lower limit of a battery power level of the secondary battery, Vs denotes a decrease in the battery power level of the secondary battery occurring when power from the secondary battery is supplied to the reception unit for an estimated maximum duration of the standby state within a time period having a unit time length, and VH denotes a charge upper limit of the battery power level of the secondary battery.

According to the above-described structure, since the threshold value Vt is smaller than the charge upper limit VH of the secondary battery, the load exerted on the secondary battery is relatively low compared to a structure where the secondary battery is charged to full capacity, and hence, longevity of the secondary battery is realized. Further, since the battery power level of the secondary battery does not drop below the discharge lower limit VL even when the standby state continues for the estimated maximum duration, power is continuously supplied to the reception unit during the standby state, and hence, the reception unit is able to receive processing requests.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An electronic apparatus comprising:
a main body that includes a reception unit and a processing unit, the reception unit receiving a processing request and the processing unit executing processing corresponding to the processing request; and
a power supply device that is connected with an external power source and a secondary battery and that includes:
a state switching unit that causes the power supply device to switch between a standby state for supplying power from the secondary battery to the reception unit without supplying power from the external power source to the main body and an operation state for supplying power from the external power source to the main body, the state switching unit causing the power supply device to switch between the standby state and the operation state such that, when a processing request is received by the reception unit while in the standby state, the state switching unit causes the power supply device to switch to the operation state, and subsequently, when execution of processing corresponding to the processing request is completed by the processing unit, the state switching unit causes the power supply device to return to the standby state;

a charge unit that charges the secondary battery with power from the external power source; and a control unit that controls the charge unit such that,
the charge unit is caused to commence charging of the secondary battery during the operation state, and
the charge unit is caused to terminate charging of the secondary battery (i) when a value indicative of a present battery power level of the secondary battery reaches a threshold value denoted by Vt and (ii) when the power supply device returns to the standby state before the indicative value reaches Vt, wherein Vt satisfies (VL+Vs)≤Vt<VH, where
VL denotes a discharge lower limit of a battery power level of the secondary battery,
Vs denotes a decrease in the battery power level of the secondary battery occurring when power from the secondary battery is supplied to the reception unit for an estimated maximum duration of the standby state within a time period having a unit time length, and
VH denotes a charge upper limit of the battery power level of the secondary battery.

2. The electronic apparatus of claim 1, wherein the control unit changes Vt in accordance with information on charge and discharge of the secondary battery.

3. The electronic apparatus of claim 2, wherein the information on charge and discharge of the secondary battery is a value indicating the number of times that the secondary battery has been charged, and
the control unit sets a higher value to Vt for higher values of the value indicating the number of times that the secondary battery has been charged.

4. The electronic apparatus of claim 3, wherein the control unit causes the charge unit to charge the secondary battery when the indicative value drops to VL due to power from the secondary battery being supplied to the reception unit during the standby state, and
the control unit sets a higher value to Vt when one of conditions (i) through (iv) is satisfied, the conditions (i) through (iv) being; (i) when a greater one of P and Q reaches a first predetermined value; (ii) when a smaller one of P and Q reaches a second predetermined value; (iii) when an average value calculated by dividing a sum of P and Q by two reaches a third predetermined value; and (iv) when the sum of P and Q reaches a fourth predetermined value, where
P denotes the number of times charging of the secondary battery has been completed by the indicative value rising to Vt, and
Q denotes the number of times charging of the secondary battery has been commenced by the indicative value dropping to VL during the standby state.

5. The electronic apparatus of claim 2, wherein the information indicates a total duration of the standby state within a time period that has the unit time length, and
the control unit changes Vt in accordance with Vs that is calculated by setting, as the estimated maximum duration of the standby state within a first time period that has the unit time length and during which charge and discharge of the secondary battery is to be performed, a total duration of the standby state within a second time period in the past indicated by the information.

6. The electronic apparatus of claim 5, wherein the unit time length is twenty-four hours, and
when the first time period corresponds to a given day, the second time period corresponds to a day before the given day or to the same day of a week one week before the given day.

7. The electronic apparatus of claim 6, wherein when a day following the given day corresponding to the first time period is not a business day and the day corresponding to the second time period is a business day,
the control unit sets, as Vt for the given day that corresponds to the first time period and during which charge and discharge of the secondary battery is to be performed, a value higher by a predetermined value Z than Vt for the given day that is calculated by setting, as the estimated maximum duration of the standby state within the given day, the total duration of the standby state within the day corresponding to the second time period.

8. The electronic apparatus of claim 2, wherein the information indicates a total discharge amount of the secondary battery during the standby state within a time period that has the unit time length,
the control unit sets, as a total discharge amount of the secondary battery during the estimated maximum duration of the standby state within a first time period that has the unit time length and during which charge and discharge of the secondary battery is to be performed, a total discharge amount of the secondary battery during the standby state within a second time period in the past indicated by the information, and
the control unit changes Vt in accordance with Vs that is calculated as a decrease in the indicative value caused by the secondary battery discharging the total discharge amount during the estimated maximum duration.

9. The electronic apparatus of claim 8, wherein the unit time length is twenty-four hours, and
when the first time period corresponds to a given day, the second time period corresponds to a day before the given day or to the same day of a week one week before the given day.

10. The electronic apparatus of claim 9, wherein when a day following the given day corresponding to the first time period is not a business day and the day corresponding to the second time period is a business day,
the control unit sets, as Vt for the given day that corresponds to the first time period and during which charge and discharge of the secondary battery is to be performed, a value higher by a predetermined value Z than Vt for the given day that is calculated by setting, as the estimated maximum duration of the standby state within the given day, the total duration of the standby state within the day corresponding to the second time period.

11. The electronic apparatus of claim 2, wherein the information on charge and discharge of the secondary battery is a value indicating a length of a period for which the secondary battery has been used, and
the control unit sets a higher value to Vt for higher values of the value indicating the length of the period for which the secondary battery has been used.

12. The electronic apparatus of claim 2, wherein the control unit changes Vt at the beginning of the time period having the unit time length.

13. The electronic apparatus of claim 2, wherein when changing Vt, the control unit also changes either one or both of a charge current value for charging the secondary battery and a time limit for charging the secondary battery.

14. The electronic apparatus of claim 1, wherein
the control unit obtains a temperature in a periphery of the secondary battery and performs correction of Vt in accordance with the temperature obtained such that $(VL+Vs) \leq Vt < VH$ is satisfied.

15. The electronic apparatus of claim 1, wherein
when the indicative value reaches Vt at a given time point during the operation state as a result of charging,
the control unit switches a charge method for charging the secondary battery from a first method that has been utilized up to the given time point to a second method according to which smaller electric current is applied to the secondary battery compared to the first method, and
the control unit causes the charge unit to charge the secondary battery according to the second method for a predetermined time period following the given time point or until the power supply device returns to the standby state from the operation state.

16. The electronic apparatus of claim 1, wherein
the control unit causes the charge unit to commence charging of the secondary battery when the power supply device switches from the standby state to the operation state.

17. The electronic apparatus of claim 1, wherein
the indicative value is a present voltage of the secondary battery.

18. The electronic apparatus of claim 1, wherein
the external power source includes, as a power source from which power is supplied to the secondary battery for charging the secondary battery, at least one of a commercial power supply, a solar cell battery, or a thermoelectric conversion element.

19. An image forming apparatus comprising:
a main body that includes a reception unit and an image forming unit, the reception unit receiving an image forming request and the image forming unit executing image forming corresponding to the image forming request; and
a power supply device that is connected with an external power source and a secondary battery and that includes:
a state switching unit that causes the power supply device to switch between a standby state for supplying power from the secondary battery to the reception unit without supplying power from the external power source to the main body and an operation state for supplying power from the external power source to the main body, the state switching unit causing the power supply device to switch between the standby state and the operation state such that, when an image forming request is received by the reception unit while in the standby state, the state switching unit causes the power supply device to switch to the operation state, and subsequently, when execution of image forming corresponding to the image forming request is completed by the image forming unit, the state switching unit causes the power supply device to return to the standby state;
a charge unit that charges the secondary battery with power from the external power source; and
a control unit that controls the charge unit such that,
the charge unit is caused to commence charging of the secondary battery during the operation state, and
the charge unit is caused to terminate charging of the secondary battery (i) when a value indicative of a present battery power level of the secondary battery reaches a threshold value denoted by Vt and (ii) when the power supply device returns to the standby state before the indicative value reaches Vt, wherein
Vt satisfies $(VL+Vs) \leq Vt < VH$, where
VL denotes a discharge lower limit of a battery power level of the secondary battery,
Vs denotes a decrease in the battery power level of the secondary battery occurring when power from the secondary battery is supplied to the reception unit for an estimated maximum duration of the standby state within a time period having a unit time length, and
VH denotes a charge upper limit of the battery power level of the secondary battery.

* * * * *